US008019005B2

(12) United States Patent
Hamamura

(10) Patent No.: US 8,019,005 B2
(45) Date of Patent: Sep. 13, 2011

(54) DATA COMMUNICATION SYSTEM, DATA DECODING APPARATUS AND METHOD THEREFOR

(75) Inventor: Masanori Hamamura, Kochi (JP)

(73) Assignee: Kochi University of Technology, Kami, Kochi (JP)

( * ) Notice: Subject to any disclaimer, the term of this patent is extended or adjusted under 35 U.S.C. 154(b) by 0 days.

(21) Appl. No.: 12/629,636

(22) Filed: Dec. 2, 2009

(65) Prior Publication Data

US 2010/0142639 A1 Jun. 10, 2010

(30) Foreign Application Priority Data

Dec. 4, 2008 (JP) ................................. 2008-309569

(51) Int. Cl.
*H04L 27/00* (2006.01)
(52) U.S. Cl. ........................................ 375/259; 375/340
(58) Field of Classification Search .......... 375/259–260, 375/262, 295, 316, 340–341
See application file for complete search history.

(56) References Cited

U.S. PATENT DOCUMENTS

| | | | | |
|---|---|---|---|---|
| 7,106,177 B2 * | 9/2006 | Logvinov et al. | ............ | 370/203 |
| 7,418,041 B2 * | 8/2008 | Jung et al. | ............ | 375/260 |
| 7,813,433 B2 * | 10/2010 | Moffatt | ............ | 375/260 |
| 2007/0263738 A1 * | 11/2007 | Jitsukawa et al. | ............ | 375/260 |
| 2009/0175160 A1 * | 7/2009 | Iraji et al. | ............ | 370/208 |

OTHER PUBLICATIONS

Office Action Issued in Japanese Patent Application No. 2008-309569 mailed Jan. 27, 2009 (with English translation).
Hou, Y. et al., A Novel Modulation with Parallel Combinatory and High Compaction Multi-Carrier Modulation, IEICE Trans. Fundamentals, vol. 90, No. 11, pp. 2556-2567, Nov. 2007.

* cited by examiner

*Primary Examiner* — Jean B Corrielus
(74) *Attorney, Agent, or Firm* — Foley & Lardner LLP

(57) ABSTRACT

A reception program maps, by PC mapping, the values of message data to symbol x, which describes the combinations of $M_p$ carrier waves of $M_c$ carrier waves with value-1 bits corresponding to the carrier waves to be transmitted, and receives the transmit signal created by performing transformation processing thereon to sample y. A matrix computing portion performs transformation processing on sample y' in a parallel form including an unnecessary signal component to symbol z'. A first decoding portion sequentially performs maximum likelihood value decoding on groups of M bits of symbol z' and finally decodes all of the symbol z' to symbol x". If the symbol x" includes $M_p$ value-1 bits, a second decoding portion handles the symbol x" as the final decoding result and if not, the second decoding portion performs maximum likelihood decoding on the entire symbol z' to obtain the final decoding result.

17 Claims, 11 Drawing Sheets

| MESSAGE | $\beta$ | FREQUENCY | $x_\beta = [x_1, x_2, \cdots, x_8]^T$ |
|---|---|---|---|
| 1100 | {1, 2} | {$f_1, f_2$} | 11000000 |
| 1101 | {1, 3} | {$f_1, f_3$} | 10100000 |
| 1111 | {1, 4} | {$f_1, f_4$} | 10010000 |
| 1110 | {1, 5} | {$f_1, f_5$} | 10001000 |
| 1010 | {1, 6} | {$f_1, f_6$} | 10000100 |
| 1011 | {1, 7} | {$f_1, f_7$} | 10000010 |
| 1001 | {1, 8} | {$f_1, f_8$} | 10000001 |
| 1000 | {2, 3} | {$f_2, f_3$} | 01100000 |
| 0000 | {2, 4} | {$f_2, f_4$} | 01010000 |
| 0001 | {2, 5} | {$f_2, f_5$} | 01001000 |
| 0011 | {2, 6} | {$f_2, f_6$} | 01000100 |
| 0010 | {2, 7} | {$f_2, f_7$} | 01000010 |
| 0110 | {2, 8} | {$f_2, f_8$} | 01000001 |
| 0111 | {3, 4} | {$f_3, f_4$} | 00110000 |
| 0101 | {3, 5} | {$f_3, f_5$} | 00101000 |
| 0100 | {3, 6} | {$f_3, f_6$} | 00100100 |

$((M_c/M_p) = (16/8)$, $\Delta ft = 0.75$, $E_b/N_o = 6$ dB, $M = 7$)

$((M_c/M_p) = (16/8), \Delta ft = 0.75, E_b/N_0 = 6$ dB, $M = 7)$

| d \ M | 7 |
|---|---|
| 0 | 1/6.40 |
| 1 | 1/6.36 |
| 2 | 1/6.18 |
| 3 | 1/5.67 |

$((M_c/M_p) = (16/8))$

DATA COMMUNICATION SYSTEM, DATA DECODING APPARATUS AND METHOD THEREFOR

CROSS-REFERENCE TO RELATED APPLICATIONS

This application claims priority to Japanese Patent Application No. 2008-309569, filed Dec. 4, 2008, the entire disclosure of which is incorporated herein by reference.

BACKGROUND OF THE INVENTION

1. Field of the Invention

The invention relates to a data communication system, data decoding apparatus and method therefor, which transmit transmission objective data in association with a symbol indicating a subset of plural carrier waves in groups of a predetermined number of bits.

2. Description of the Related Art

For example, Y. Hou and M. Hamamura, "A novel modulation with Parallel combinatory and high compaction multi-carrier modulation", IEICE Trans. Fundamentals, vol. 90, no. 11, pp. 2556-2567, November 2007 (which will be called Non-Patent Document 1) discloses a PC/HC-MCM (high compaction multi-carrier modulation) applying PC to high definition multi-carrier modulation (HC-MCM).

However, Non-Patent Document 1 does not disclose a method that decodes, by two-level decoding, a transmit signal acquired by multi-carrier modulation.

In other words, Non-Patent Document 1 does not disclose the configuration including performing first decoding including maximum likelihood decoding for decoding in small groups at a time sequentially plural times on the data included in a sample acquired from a transmit signal, finally decoding all data, performing second decoding including maximum likelihood decoding on all or partial data patterns imaginable from the result of the first decoding and decoding the data only if it is decided that the result of the first decoding contains an error.

SUMMARY OF THE INVENTION

The present invention was made against the background and provides a communication system, data decoding apparatus and method therefor with the improvement that decodes data from a transmit signal faster and at a lower error rate.

According to an aspect of the invention, there is provided a communication system comprising: a transmitting apparatus; and a receiving apparatus, the transmitting apparatus having: a mapper for mapping transmission objective data of a predetermined bit count to be transmitted to a first symbol including a first number of data describing combinations of a second number of carrier waves (first number>second number) corresponding to all of the possible transmission objective data within the first number of carrier waves usable for the transmission; a first transformer for performing a first transformation to transform the first symbol into transmission signal that including first sample having third number of data by having the first symbol be a first number×1 first vector to multiple the first vector by a first number×third number (third number>first number) matrix, in which the result of first multiplication of the first matrix by the first number×the first number diagonal matrix that corresponding to the multiplication of each of a third number of data included in the first sample obtained by the first transformation by each of second coefficients for third number of data included in the first sample being equal to the result of second multiplication of an a third number×first number upper triangular matrix by a third number×third number non-singular matrix in a complex form, and the non-singular matrix, and the upper triangular matrix being given such that the result of the first multiplication and the result of the second multiplication being equal in accordance with the first matrix and the diagonal matrix; multiplier for multiplying each of the first samples included in the transmission signal by each of the second coefficients; and a transmitter for transmitting the transmission signal including the third number of signals to the receiving apparatus, the receiving apparatus having: a receiver for receiving the transmission signal having possibility to include a different signal component from the transmission signal from the transmitting apparatus; a second transformer for performing a second transformation to transform the complex conjugate inverse matrix in the non-singular matrix into the second sample corresponding to the multiplication result of the upper triangular matrix by the first vector by having the third number of data included in the first sample included in the received transmission signal be a second vector of the third number×1 format to multiply the complex conjugate inverse matrix in the non-singular matrix by the second vector; a first decoder for sequentially performing first decoding on the data included in the third number of second sample acquired by the second transformation and acquiring groups each including the fourth number of data (the first number within the first symbol>fourth number to sequentially decode parts of the second symbol corresponding to the first symbol for acquiring the entire second symbol; a second decoder, if there is a possibility that the second symbol decoded by the first decoding is identical to the first symbol corresponding to the second symbol, for having the second symbol acquired by the first decoding be the first symbol, or if not, for performing second decoding on all of the third number of second sample to have the symbol acquired by the second decoding be the second symbol; and a demapper that decodes the transmission objective data from the first symbol acquired by the second decoder, wherein: the first decoding is implemented by performing maximum likelihood decoding on the third number of second sample with all of the results of the multiplication of the fourth number (the first number>fourth number) of elements within the first symbol by the fourth number×1 upper triangular matrix of the vector; the second decoding is implemented by selecting a combination having the highest possibility of being identical to the third number of second sample among the combinations of the second sample corresponding to the second symbol having no possibility of being identical to the first symbol, which is acquired by the first decoding; and the second decoding is implemented by selecting a combination having the highest possibility of being identical to the second sample corresponding to the second symbol being acquired by the first decoding to have no possibility of being identical to the first symbol among the first sample corresponding to the second symbol including an equal number of value-1 bits to that of the first symbol being acquired by replacing the number of value-1 bits included in the second symbol being acquired by the first decoding to have no possibly of being identical to the first symbol by the number of value 0 bits within a predetermined range.

According to another aspect of the invention, there is provided a data decoding apparatus for receiving transmission signal to decode transmission objective data from the received transmission signal generated by mapping the transmission objective data including first number of data each indicating a combination of a second number (first number>second number) of carrier waves corresponding to all of the possible transmission target data within the first number of carrier waves usable for transmission to decode the transmission target data from the received transmit signal, the apparatus comprising: a receiver for receiving the transmission signal having possibility to include a different signal component from the transmission signal; a transformer for transforming the received transmission signal to a second sample having the third number of data corresponding to the first sample; a first decoder for sequentially performing first decoding on a third number of data included in the acquired second sample to decode second symbol corresponding to the first symbol by sequentially decoding parts of the second symbol corresponding to the first symbol; a second decoder, if there is a possibility that the second symbol decoded by the first decoding is identical to the first symbol corresponding to the second symbol, for having the second symbol acquired by the first decoding be the first symbol, or if not, for performs second decoding on all of the data included in the second sample to have the second symbol acquired by the second decoding be the first symbol; and a demapper that decodes the transmission objective data from the first symbol acquired by the second decoder.

According to another aspect of the invention, there is provided a data decoding method for receiving transmission signal to decode transmission objective data from the received transmission signal generated by mapping the transmission objective data including first number of data each indicating a combination of a second number (first number>second number) of carrier waves corresponding to all of the possible transmission target data within the first number of carrier waves usable for transmission to decode the transmission target data from the received transmit signal, the method comprising the steps of: the method comprising the steps of: receiving the transmission signal having possibility to include a different signal component from the transmission signal; transforming the received transmission signal to a second sample having the third number of data corresponding to the first sample; sequentially performing first decoding on a third number of data included in the acquired second sample to decode second symbol corresponding to the first symbol by sequentially decoding parts of the second symbol corresponding to the first symbol; if there is a possibility that the second symbol decoded by the first decoding would be identical to the first symbol corresponding to the second symbol, for having the second symbol acquired by the first decoding be the first symbol, or if not, performing second decoding on all of the data held by the second sample to have the second symbol acquired by the second decoding be the first symbol; and decoding the transmission objective data from the first symbol acquired by the second decoding.

The communication system, data decoding apparatus and method therefor according to the present invention are configured to perform decoding from a transmit signal to data, as will be described below.

Notably, for concrete and clear description on those components, the case where a symbol x ($x_1$ to $x_{Mc}$) and a sample y ($y_1$ to $y_{Mt}$) are used will be described as a concrete example.

The data bits included in a data stream to be transmitted are divided into groups of $M_{pc}$ bits, and the data of a group of $M_{pc}$ bits are transmitted by one transmit signal frame.

The transmit signal uses $M_c$ carrier waves for data transmission. The value exhibited by each $M_{pc}$-bit data corresponds to any one combination of $M_p$ (where $M_p < M_c$) carrier waves selected from $M_c$ carrier waves and may be mapped to a first symbol x ($x_1$ to $x_{Mc}$), for example.

However, the bit count $M_{pc}$ of data to be transmitted by one frame of carrier waves is limited by:

$$M_{pc} \leq \|\log_{Mc} C_{Mp}\|$$

(where operator $\|x\|$ is an integer equal to an operand x or the highest integer which is lower than the operand x, and $_YC_Z$ (Y>Z) is the number of combinations of the selections of Z items from Y items).

The first symbol x ($x_1$ to $x_{Mc}$) may be handled as, for example, an $M_c \times 1$ vector, be multiplied by an $M_c \times M_t$ matrix F that transforms the first symbol to a sample y ($y_1$ to $y_{Mt}$) and thus be transformed to the sample y ($y_1$ to $y_{Mt}$) (where it may be understood that the transformation is processing of transforming a symbol in one domain to a sample in another domain, such as a symbol in a frequency domain to a sample in a time domain).

Furthermore, as necessary, the elements ($y_1$ to $y_{Mt}$) of the sample y are multiplied by the coefficients w ($w_1$ to $w_{Mt}$) of a window function that limits the bandwidth of a transmit signal.

The matrix F in a complex form is given as F=QR which is the value resulting from the multiplication of a unitary matrix (orthogonal matrix (non-singular matrix) in a complex form) Q, which will be described later, by an $M_t \times M$ upper triangular matrix R in a complex form (while it is given as WF=QR (where W=diag[$w_1$ to $w_{Mt}$]) if the sample y is multiplied by the coefficients w of a window function when the sample y are not multiplied by the coefficients w of a window function).

The thus-acquired sample y (($y_1$ to $y_{Mt}$) or ($w_1y_1$ to $w_{Mt}y_{Mt}$)) undergoes signal processing such as serial/parallel transformation and digital/analog transformation to a transmit signal y(t), which is then transmitted through a transmission path on which a signal component n(t) excluding the transmit signal, such as a noise and radio interference, may possibly be superimposed on the signal y(t) is.

The communication system, data decoding apparatus and method therefor according to the present invention receive a transmit signal y(t)+n(t), perform processing such as analog/digital transformation and serial/parallel transformation on the received transmit signal y(t)+n(t), thus acquire the sample y' ($y'_1$ to $y'_{Mt}$) corresponding to the transmitted sample y ($y_1$ to $y_{Mt}$).

The sample y' ($y'_1$ to $y'_{Mt}$) is handled as an $M_t \times 1$ vector $Y_{Bi}$, and the vector $y_{Bi}$ is multiplied by an $M_t \times M_t$ complex-conjugate-transposed (Hermit-transposed) unitary matrix ($Q^H$ (which is the inverse function of the non-singular matrix)) for transformation to a symbol z ($z_1$ to $z_{Mt}$). (Notably, the transformation may also be understood as processing of transforming a symbol in one domain to a sample in another domain, such as the transformation from a sample in a time domain to a symbol in a frequency domain).

As a result of the multiplication, the second symbol x' ($x'_1$ to $x'_{Mc}$) corresponds to the first symbol x ($x_1$ to $x'_{Mc}$).

In other words, when the second symbol x' ($x'_1$ to $x'_{Mc}$) is handled as the $M_c \times 1$ vector $x_{Bi}$, the vector $x_{Bi}$ and $Y_{Bi}$ have a relationship of $Y_{Bi}=FX_{Bi}=QRX_{Bi}$. The multiplication of the vector $y_{Bi}$ by the complex conjugate transposed matrix $Q^H=Q^{-1}$ in the unitary matrix Q results in $Q^H Y_{Bi}=Q^H QRX_{Bi}=RX_{Bi}$ because F=QR as described above.

The $M_c$ elements $x'_1$ to $x'_{Mc}$ of the second symbol x' ($x'_1$ to $x'_{Mc}$) are the first to $M_c$th elements in an $M_t \times 1$ vector $Rx_{Bi}$, and the other elements in the vector $Rx_{Bi}$ are 0.

Groups of M (where M<$M_c$) elements are extracted sequentially from the vector $Rx_{Bi}$ in order from the element $x'_{Mc}$ side. The extracted M elements sequentially undergo maximum likelihood decoding. Finally, the second symbol x'

($x'_1$ to $x'_{Mc}$), which is estimated as being the closest to the first symbol x ($x_1$ to $x_{Mc}$), is decoded (first decoding).

Here, when the second symbol x' ($x'_1$ to $x'_{Mc}$) does not include equal numbers of value-1 bits and value-0 bits to those of the first symbol x ($x_1$ to $x_{Mc}$), there is no possibilities that second symbol x' ($x'_1$ to $x'_{Mc}$) is equal to the first symbol x ($x_1$ to $x_{Mc}$).

In this case, maximum likelihood decoding using the entire vector $Rx_{Bi}$ that gives the second symbol x' ($x'_1$ to $x'_{Mc}$) having the numbers of value-1 bits and value-0 bits which have come to be equal or closer to the first symbol by replacing 1-bit values in the second symbol x' ($x'_1$ to $x'_{Mc}$) by 0-bit values and/or replacing 0-bit values by 1-bit values. Thus, the second symbol x' ($x'_1$ to $x'_{Mc}$) is decoded (second decoding).

Having described that the communication system, data decoding apparatus and method therefor according to the present invention perform computing using vector and matrices, the configurations of the vector and the rows and columns of the matrices in the Claims, the specification and drawings the present invention are given only for the illustration purpose only.

In other words, even when the vector and/or matrices in the Claims, specification and drawings of the present invention, appropriate change of the computing thereon can allow equivalent handling between the untransposed vector and matrices and the transposed vector and matrices with transposition.

Having described that the configurations of the claimed vector and matrices agree with the configurations of the vector and matrices in the specification and drawings for avoiding complex descriptions, it should be noted that the systems, apparatus and methods configured by transposing the claimed vector and/or matrices or changing the configuration to a configuration which can be regarded as being equivalent by appropriate change in computing are included in the scope of the disclosed technology which is to be recognized by the claims of the present invention.

It should also be noted that the configurations in which bit values are simply inverted or the number of bits is changed in the disclosed matters of the present invention are included within the scope of the disclosed technology to be recognized by the claims of the present invention.

The claimed technological advantages and other technological advantages will be understood by those skilled in the art by reading detail descriptions on embodiments illustrated in the drawings.

The attached drawings are partially included in the specification of the present invention and illustrate embodiments of the claimed invention. Along with the illustrations, they play a role in illustrating the principle of the invention.

It should be understood that the drawings referred in the specification of the present invention may not be rendered to scale unless otherwise indicated.

BRIEF DESCRIPTION OF THE DRAWINGS

FIG. 7 is a table illustrating the symbol $x_B$ acquired by mapping by the PC mapping portion in the transmission program shown in FIG. 6.

DESCRIPTION OF THE PREFERRED EMBODIMENTS

Figure 1:
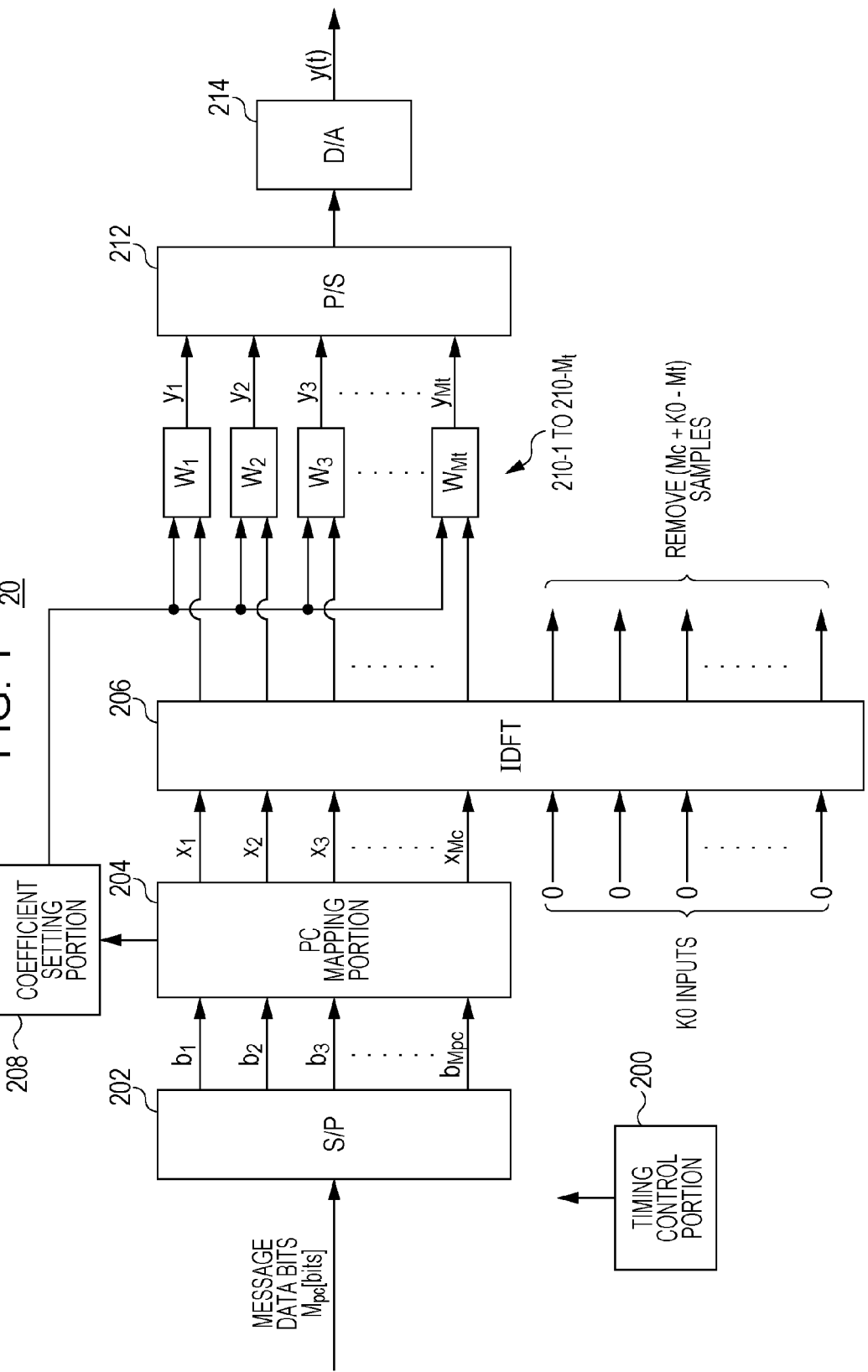
FIG. 1 is a diagram showing a first transmitter that creates a transmit signal in PC/HC-MCM by using inverse discrete Fourier transform.

An embodiment of the claimed invention will be described in detail below.

The embodiment of the claimed invention is illustrated in the attached drawings.

The claimed invention will be described in relation to the embodiment, but a person skilled in the art will understand that it is not intended that the embodiment limits the claimed invention to the disclosed details.

Conversely, it is intended that the claimed invention includes the spirit of the claimed invention and alternatives, changes and equivalents which can be included in the claimed invention.

The claimed invention will be described concretely and in detail such that the claimed invention can be understood sufficiently.

However, a person skilled in the art may understand that it is not intended that the implementation of the claimed invention requires all of the matters, which will be described concretely and in detail.

Notably, known methods, procedures, components and circuits may not be described in detail in order to prevent the unnecessary difficulty to understand the aspects of the present invention.

Unless otherwise indicated, it should be understood that the discussions using the terms "transmit", "receive" and "transform" relate to an electronic computing device in a computer system, for example, and the actions and processes by electronic devices associated therewith throughout the entire disclosure, which will be clarified by the later discussions.

The electronic computing device in a computer system, for example, operates and transforms the data expressed as a physical (and electronic) amount within a register and memory in the computer system to other data also expressed as a physical amount within a computer system memory or register or other similar information storage, a transmitting device or a display device.

The present invention is also suitable for the use of other computer systems such as optical and mechanical computers.

INTRODUCTION

First of all, before describing the communication system according to the present invention, the data transmission system relating to the communication system according to the present invention will be described as an introduction.

Hitherto, orthogonal frequency division multiplexing (which will be called OFDM) has been used as one of data transmission systems.

In OFDM, the ratio of the peak value to the average value of the power of a transmit signal (which will be called peak-to-average power ratio or PAR) is large. In order to reduce the PAR, PC-OFDM applying parallel combinatory (which will be called PC) signaling technique has been proposed.

High-compaction multi-carrier modulation (which will be called HC-MCM) has been proposed that transmits a truncated version of signal in OFDM. However, in this system, discontinuity appears between the amplitudes of two consecutive signal waveforms, which causes an unnecessary increase in frequency bandwidth.

In order to overcome the malfunction, parallel combinatory HC-MCM (which will be called PC/HC-MCM) has been proposed in order to improve the bit error rate (which will be called BER) in HC-MCM and to reduce the PAR.

PC/HC-MCM compares a coefficient contained in a transmit signal and the coefficients corresponding to all possible symbol.

On the basis of the comparison result, the symbol with the highest possibility of the correspondence to the coefficient contained in the transmit signal, that is, the symbol with the shortest distance in a Euclid space is selected. Thus, the symbol corresponding to the coefficient contained in the transmit signal can be decoded (which may be called maximum likelihood (or ML) decoding).

However, the maximum likelihood decoding in PC/HC-MCM requires a large amount of computing, and the implementation requires a high computing processing capability and a long computing time. Therefore, for example, the efficiency implementation and an increase in performance are difficult where $M_c \gg 1$ and $M_p$ is approximately equal to $M_c/2$.

In order to reduce the complexity of computing in decoding processing, the present invention relates to Complexity Reduced PC/HC-MCM with an improvement by using QR decomposition (or QRD, which is decomposition of a matrix X to an orthogonal matrix (or unitary matrix) in a complex form and an upper triangular matrix R where X=QR) algorithm and M-algorithm and adopting a decoding method with an increased efficiency.

The present invention further relates to an evaluation result describing how CR-PC/HC-MCM can decode data with a low BER from a transmit signal on which an unnecessary signal component such as noise and radio interference is superimposed excluding a desirable signal component.

[PC-OFDM]

Before describing CR-PC/HC-MCM, PC-OFDM on which CR-PC/HC-MCM is based will first be described for easier understanding.

PC-OFDM is OFDM that carries message data by PC signaling and a general N-ary (where N is generally a symbol typified by an integer of the exponentiation of 2) amplitude and phase shift keying (N-APSK).

Taking FSK as an example, the N-ary modulation method will be further described.

For example, in a binary (where N=2) FSK modulation method, two carrier waves $f_0$ and $f_1$ may be used, and either data 1 or 0 may be transmitted in accordance with the transmission of either carrier wave $f_0$ or $f_1$.

Similarly, in a quaternary FSK modulation method, four carrier waves $f_0$ to $f_3$ may be used, and one of data (0,0), (0,1), (1,0) and (1,1) may be transmitted in accordance with the transmission of one of the carrier waves $f_0$ to $f_3$.

In this way, in an N-ary FSK modulation method, N carrier waves $f_0$ to $f_{N-1}$ may be used, and the data for $n=\log_2 N$ bits may be transmitted at one time in accordance with the transmission of one of the carrier waves $f_0$ to $f_{N-1}$.

The PC signaling technique will be further described.

The PC signaling technique combines and transmits plural carrier waves and thus increases the bit count of data which are transmittable at one time.

For example, two carrier waves are selected from four carrier waves and are transmitted, which means $_4C_2=6$ combinations when the other two carrier waves are not transmitted.

With the PC signaling technique, for example, $M_p$ carrier waves may be selected and be transmitted from $M_c$ carrier waves, and the other carrier waves may not be transmitted. In this case, $_{M_c}C_{M_p}$ data can be transmitted at one time thereby (where $_xC_y$ is a combination of x and y (where y is to be selected from x, x and y are positive integers and $x \geq y$), and $_xC_y$ will also be called (x/y) for clear and simple descriptions below).

In this way, according to the N-ary FSK modulation method, the data of 2 bits (which are four data) can be transmitted at one time. On the other hand, according to the PC signaling technique, six data can be transmitted at one time.

Furthermore, for example, according to the PC signaling technique that selects and transmits two carrier waves from eight carrier waves, (8/2)=28 data can be transmitted at one time.

The total number of preallocated carrier waves (or carriers) will be called $M_c$, and $M_p$ ($M_c > M_p$) will refer to the number of carrier waves selected for PC signaling below.

In this case, the number of message data bits $M_{total}$ for each signal in PC-OFDM is given by Expression 1 below.

$$M_{total}=M_{apsk}+M_{pc} \quad \text{[Expression 1]}$$

where $M_{apsk}$ [bit] is the number of message bits mapped to an N-ary APSK signal point constellation (including, for example, 2 points of ±1 in BPSK or 4 points of ±1 ±j (where j is an imaginary number unit) in QPSK) and are given by Expression 2 below.

$M_{pc}$ [bit] is a bit count of the message data encoded to one of the combinations (or sets) of predetermined $M_p$ carrier waves within $M_c$ carrier waves.

$$M_{apsk}=M_p \log_2 N \quad \text{[Expression 2]}$$

In other words, the relationship among the total number $M_c$ of carrier waves to be used for transmission, $M_p$ to be used for the combination, and the bit count $M_c$ of the message data is given by Expression 3-1 or 3-2 below.

$$M_{pc} \leq \|\log_2(M_c/M_p)\| \quad \text{[Expression 3-1],}$$

which is generally $$M_{pc} = \|\log_2(M_c/M_p)\| \quad \text{[Expression 3-2]}$$

Notably, the operator $\|x\|$ used in Expression 3-1 and Expression 3-2 above refers to an integer which is equal to an operand x or a highest integer which is lower than the operator x.

PC-OFDM is modeled by Expressions 4 and 5 below.

$$y(t) = \sum_{n=0}^{\infty} s^{(n)}(t - nT)$$ [Expression 4]

$$s^{(n)}(t) = \sum_{l=1}^{N_c} x_l^{(n)} e^{j2\pi(l-1)\Delta ft},$$ [Expression 5]

$$0 \le t < 1/\Delta f$$

where $x_l^{(n)}$ (where l=1, 2, . . . , N) is a complex symbol to a first carrier wave and is placed at (N+1)-ary APSK signal point resulting from the addition of the point with an amplitude of 0 to the signal point in a normal N-ary APSK modulation method.

In $nT \le t < (n+1)T$, $T = 1/\Delta f$ (second) is a time length of one signal in PC-OFDM, and $\Delta f$(Hz) is a frequency spacing.

Here, $M_{pc}$ message data bits can be transmitted without N-ary APSK in PC-OFDM.

In this case, $x_1^{(n)} = \{0,1\}$, and $M_{total} = M_{pc}$.

[PC/HC-MCM]

PC-OFDM on which CR-PC/HC-MCM is based will further be described.

PC/HC-MCM is divided into two systems of modulated and unmodulated PC/HC-MCM. Modulated PC/HC-MCM transmits a signal in a truncated signal waveform.

On the other hand, unmodulated PC/HC-MCM transmits a signal in a truncated signal waveform without N-ary ASK modulation.

Therefore, the signal in PC/HC-MCM can be modeled as Expression 6.

$$s^{(n)}(t) = \sum_{l=1}^{N_c} x_l^{(n)} e^{j2\pi(l-1)\Delta ft}, 0 \le t < T$$ [Expression 6]

where $T < 1/\Delta f$.

[Transmitter 20]

The unmodulated PC/HC-MCM will be described that substantially makes the most of preferred characteristics of PC/HC-MCM below.

The unmodulated PC/HC-MCM will be simply called PC/HC-MCM below.

FIG. 1 is a diagram showing a first transmitter 20 that creates a transmit signal in (IDFT-based) PC/HC-MCM by using inverse discrete Fourier transform (which will be called IDFT).

As shown in FIG. 1, the first transmitter 20 includes a timing control portion 200, a serial/parallel transforming portion (S/P) 202, a PC mapping portion 204, an IDFT portion 206, a coefficient setting portion 208, multiplexing portions 210-1 to 210-$M_t$, a parallel/serial transforming portion (P/S) 212 and a digital/analog transforming portion (D/A) 214.

Notably, identical numbers are given to the components which are substantially identical in the drawings.

The transmitter 20 creates a signal in PC/HC-MCM through those components.

The transmitter 20 may be implemented as software that operates on a signal processing apparatus having a DSP (or Digital Signal Processor) and an analog/digital transforming device (which is also true for a receiver 22 to be described with reference to FIG. 2).

The timing control portion 200 controls the timings of the processing by the components in the transmitter 20.

The S/P 202 transforms the message data bits of $M_{pc}$ bits input in a serial form to the one in a parallel form and outputs the result to PC mapping portion 204.

The PC mapping portion 204 maps the message data bits of $M_{pc}$ bits input from the S/P 202 with combinations of $M_c$ carrier waves within Mp carrier waves, as described above regarding the PC signaling technique.

The PC mapping portion 204 performs mapping by handling the value of the bit corresponding to $M_p$ carrier waves in association with the value of the message data of $M_{pc}$ bits within the bits of a symbol x ($x_1$ to $x_{Mc}$) including $M_c$ bits as 1 and the value of the other output bits as 0. The PC mapping portion 204 then handles the symbol x ($x_1$ to $x_{Mc}$) acquired as a result of the mapping as the first to $M_c$th inputs of the IDFT portion 206.

Notably, the number $M_c$ of carrier waves, the number $M_p$ of carrier waves selected from $M_c$ carrier waves is selected so as to satisfy Expression 3 for the message data bit count $M_{pc}$.

The PC mapping portion 204 handles the numerical value 0 as $K_0$ input subsequent to ($M_c$+1)th input to the IDFT portion 206 as padding.

The IDFT portion 206 receives the mapped message data bits from the PC mapping portion 204, performs inverse discrete Fourier transform (IDFT) processing thereon, and transforms the message data bits in a frequency domain to one in a time domain.

As a result of the IDFT processing, ($M_t$+$K_0$) samples are acquired.

The IDFT portion 206 removes ($M_c$+$K_0$−$M_t$ (where $M_c$<$M_t$+$K_0$)) samples among them and outputs the result to the multiplexing portion 212-1 to 212-$M_t$ as the sample y ($y_1$, $y_2$, . . . , $Y_{Mt}$) resulting from the inverse discrete Fourier transform.

Notably, the processing of removing ($M_c$+$K_0$−$M_t$) samples from the sample acquired as a result of the inverse discrete Fourier transform corresponds to truncating a signal waveform by a rectangular window function in a time domain in PC/HC-MCM.

The coefficient setting portion 208 outputs the coefficients $w_1$ to $w_{Mt}$ to be multiplied by the elements of the sample y ($y_1$, $y_2$, . . . and $y_{Mt}$), which are defined by Expression 7 below and output from the IDFT portion 206 to the multiplexing portion 210-1 to 210-$M_t$, respectively.

Notably, the coefficients $w_1$ to $w_{Mt}$ are coefficients of the window function for waveform shaping on a transmit signal output from the transmitter 20.

For the waveform shaping, a wide variety of window functions may be used, but the case where a coefficient of the window function expressed by Expression 7 for the purpose of the limitation of the band is a concrete example.

$$w_i = \sin[(i-1)\pi/M_t] \text{ (where } i=1 \text{ to } M_t)$$ [Expression 7]

The PS 212 transforms the sample y ($y_1$, $y_2$, . . . , $y_{Mt}$) as a result of the inverse discrete Fourier transform, which is input in a parallel form from the multiplexing portion 210-1 to 210-$M_t$, to those in a serial form and outputs them to the D/A 214.

The D/A 214 transforms the result of the inverse discrete Fourier transform in a digital form, which is input in a serial form from the PS 212, to that in an analog form and thus creates and outputs the transmit signal y(t).

The transmit signal y(t) further undergoes processing such as frequency transformation and power amplification and are transmitted as transmit signal to the apparatus in the receiver side through a communication line, such as a radio communication path, on which an unnecessary signal component such as noise may possibly be superimposed.

[Receiver 22]

The receiver 22 that receives a transmit signal created by the transmitter 20 (refer to FIG. 1) and transmitted through a radio transmission path, for example, and uses a DFT to decode message data will be described below.

Figure 2:
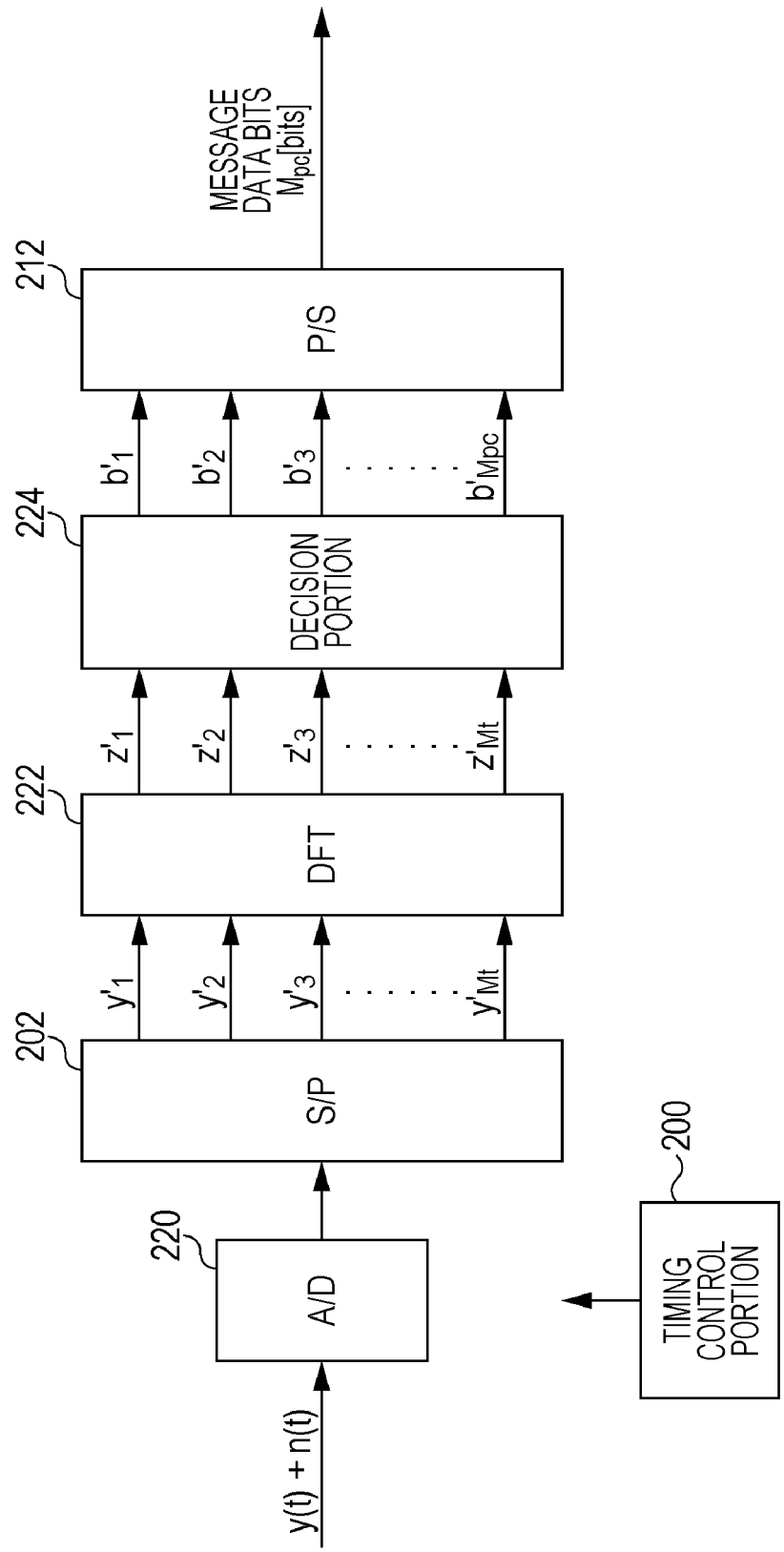
FIG. 2 is a diagram showing the configuration of a receiver that receives a transmit signal from the transmitter shown in FIG. 1 and decodes message data.

FIG. 2 is a diagram showing the configuration of the receiver 22 that receives a transmit signal from the transmitter 20 shown in FIG. 1 and decodes message data.

As shown in FIG. 2, the receiver 22 includes a timing control portion 200, an analog/digital transforming portion (A/D) 220, an S/P 202, a discrete Fourier transform (DFT) 222, a decision portion 224 and a P/S 212.

The receiver 22 receives a transmit signal in PC/HC-MCM from the transmitter 20, which is the other communication party, through those components and decodes message data.

As shown in FIG. 2, an unnecessary signal component such as additive white Gaussian noise (or AWGN) n(t) is superimposed, in a radio transmission path, on transmit signal y(t) from a communication apparatus 2 which is the other communication party.

In a reception program 34, the timing control portion 200 controls the timings for processing by the components in the receiver 22.

The A/D 220 transforms the transmit signal y(t)+n(t) in an analog form, which is received through the radio transmission path (in FIG. 3), is acquired by signal processing such as amplification and frequency transformation and is the result of the addition of additive white Gaussian noise n(t), for example, to that in a digital form and outputs it to the S/P 202.

The S/P 202 transforms the transmit signal in a digital form, which is input serially from the A/D 220 to $M_t$ samples $y'_1$ to $y'_{Mt}$ in a parallel from and outputs it to the DFT portion 222.

The DFT portion 222 accepts the samples $y'_1$ to $y'_{Mt}$ from the S/P 100 as the first to $M_t$th inputs, performs discrete Fourier transform (DFT) on the received samples in a time domain, creates $M_t$ samples $z'$ ($z'_1$ to $z'_{Mt}$) in a frequency domain and outputs them to the decision portion 224.

The decision portion 224 decides what kind of PC (parallel combinatory) signal has been transmitted from the receiver 223.

In other words, the decision portion 224 performs the processing corresponding to the PC mapping portion 204 in the receiver 22 (in FIG. 1) and decides the one having the highest possibility of correspondence to $M_t$ samples $z'(z'_1$ to $z'_{Mt})$ input from the DFT 222, within a set $B^{(n)}$ of all carrier waves possibly usable for $M_{pc}$-bit message data, to perform maximum likelihood decoding.

The set $B^{(n)}$ of carrier waves includes all of $M_t$ replica sample $z_{b,k}$ ($z_{b,1}$ to $z_{b,Mt}$), which may be possibly created in accordance with the value of all possible $M_{pc}$-bit message data. The first element index bit of each of the samples $z$ ($z_1$ to $z_{Mt}$) is an integer indicating $M_{pc}$-bit message data corresponding to the sample $z_{b,k}$ ($z_{b,1}$ to $z_{b,Mt}$).

In order to perform the decision, the decision portion 224 finds out a set B' of carrier waves satisfying Expression 8 below from the set B∈C of all possible carrier waves.

$$B' = \underset{B \in C}{\arg\min}\left( J(B) = \sum_{k=1}^{N_c+K_0} |\hat{z}_k - z_{B,k}|^2 \right)$$ [Expression 8]

where "arg" refers to a declination of a complex number, and "arg min" refers to "minimize evaluation function".

Notably, the replica sample $z_{b,k}$ ($z_{b,1}$ to $z_{b,Mt}$) is defined as the entire replica sample $z_{b,k}$ which may possibly acquired from the transmit signal excluding noise.

In other words, the replica sample $z_{b,k}$ ($z_{b,1}$ to $z_{b,Mt}$) is the sample $z_{b,k}$ ($z_{b,1}$ to $z_{b,Mt}$) acquired by performing DFT processing by the DFT 222, directly without through a transmission path, on the entire sample y ($y_1$ to $y_{Mt}$), which is acquired by performing IDFT processing by the IDFT portion 206 on the entire symbol x ($x_1$ to $x_{Mc}$), which is acquired by mapping by the PC mapping portion 204 on all of the message data bits of $M_{pc}$ bits.

The decision portion 224 compares, as expressed in Expression 9, the replica sample $z_{b,k}$ ($z_{b,1}$ to $z_{b,Mt}$) and the sample z' ($z'_1$ to $z'_{Mt}$) including noise, which is acquired by the reception, and selects the replica sample $z_{b,k}$ having the highest possibility of being identical to the sample z' ($z'_1$ to $z'_{Mt}$) including noise.

The decision portion 224 outputs the $M_{pc}$-bit message data corresponding to the symbol x' ($x'_1$ to $x'_{Mc}$) indicated by the index of the replica sample $z_{b,k}$ selected as described above to the P/S 212 as the demodulation result.

The P/S 212 transforms the message data input in a parallel form to one in a serial form and externally outputs the result.

[Communication System 1 Applying CR-PC/HC-MCM]

An embodiment of CR-PC/HC-MCM according to the present invention will be described below.

Figure 3:
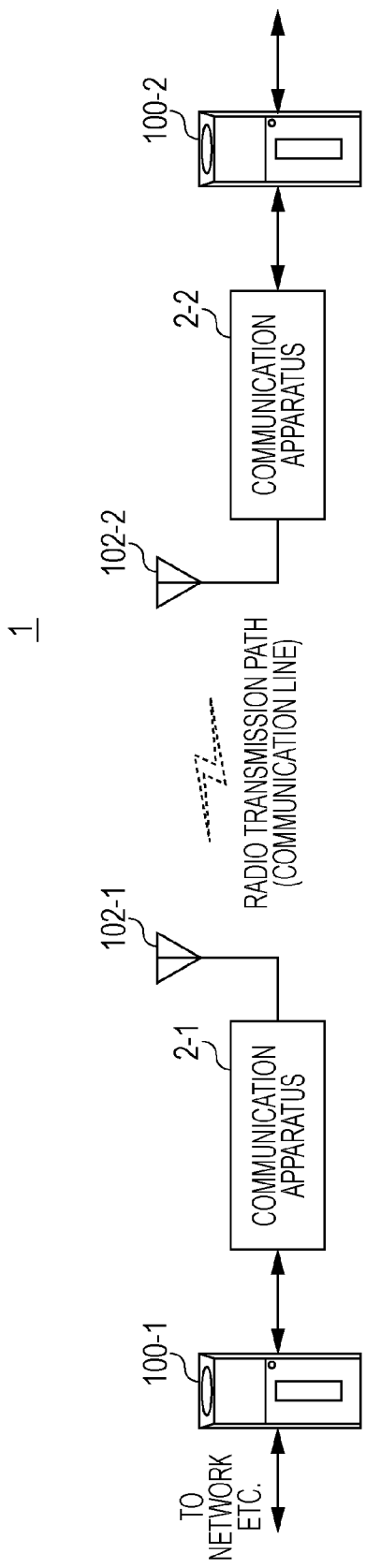
FIG. 3 is a configuration diagram showing a communication system in CR-PC/HC-MCM to be described as an embodiment according to the present invention.

FIG. 3 is a configuration diagram showing the communication system 1 in CR-PC/HC-MCM to be described as an embodiment according to the present invention.

Figure 4:
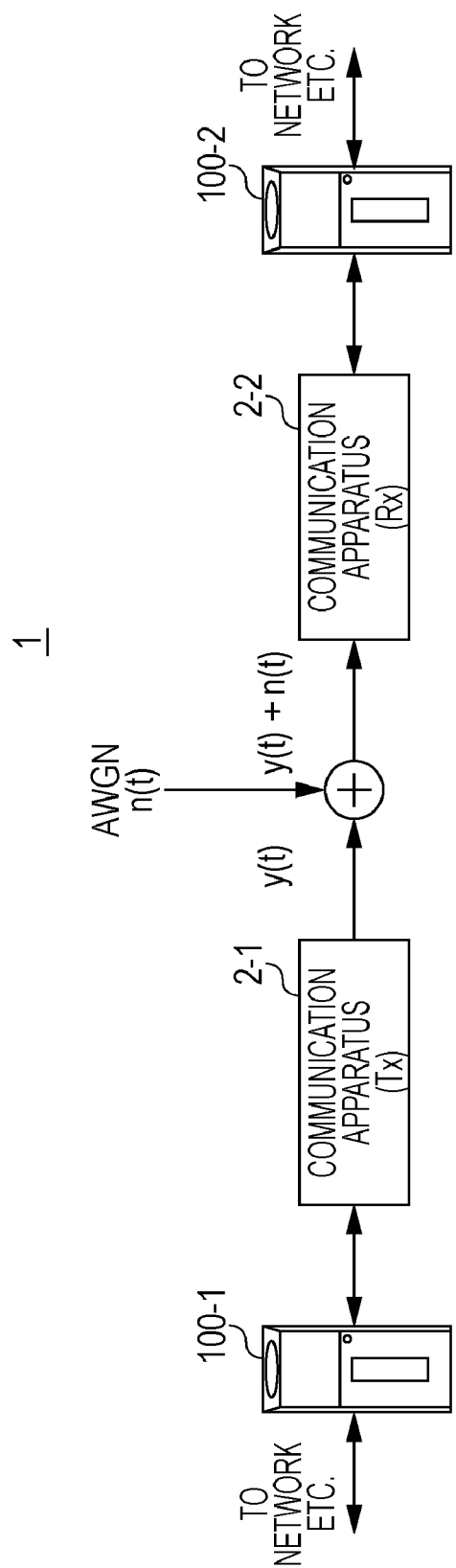
FIG. 4 is a diagram illustrating a form in which an unnecessary signal component is superimposed on a transmit signal on a communication line of the communication system shown in FIG. 1.

FIG. 4 is a diagram illustrating a form in which an unnecessary signal component is superimposed on a transmit signal on a communication line of the communication system 1 shown in FIG. 1.

As shown in FIG. 3, in the communication system 1, an information processing apparatus 100-1 connecting to a network, for example, and a communication apparatus 2-1 are connected, an information processing apparatus 100-2 connecting to a network, for example, and a communication apparatus 2-2 having a substantially similar configuration to that of the communication apparatus 2-1 are connected, and the communication apparatus 2-1 and 2-2 are connected through a communication line such as a radio transmission path.

Notably, as shown in FIG. 4, on the communication line of the communication system 1, an unnecessary signal such as additive white Gaussian noise (or AWGN) n(t) is superimposed on a transmit signal transmitted from the communication apparatus 2-1.

The information processing apparatus 100-1 and 100-2, for example, will be simply called information processing apparatus 100, for example, below if specific identification of the components is not necessary.

Notably, the information processing apparatus 100 in the communication system 1 may be a computer connectable to the communication apparatus 2 and a network, for example, between which message data can be received and be transmitted.

[Hardware Configuration]

Figure 5:
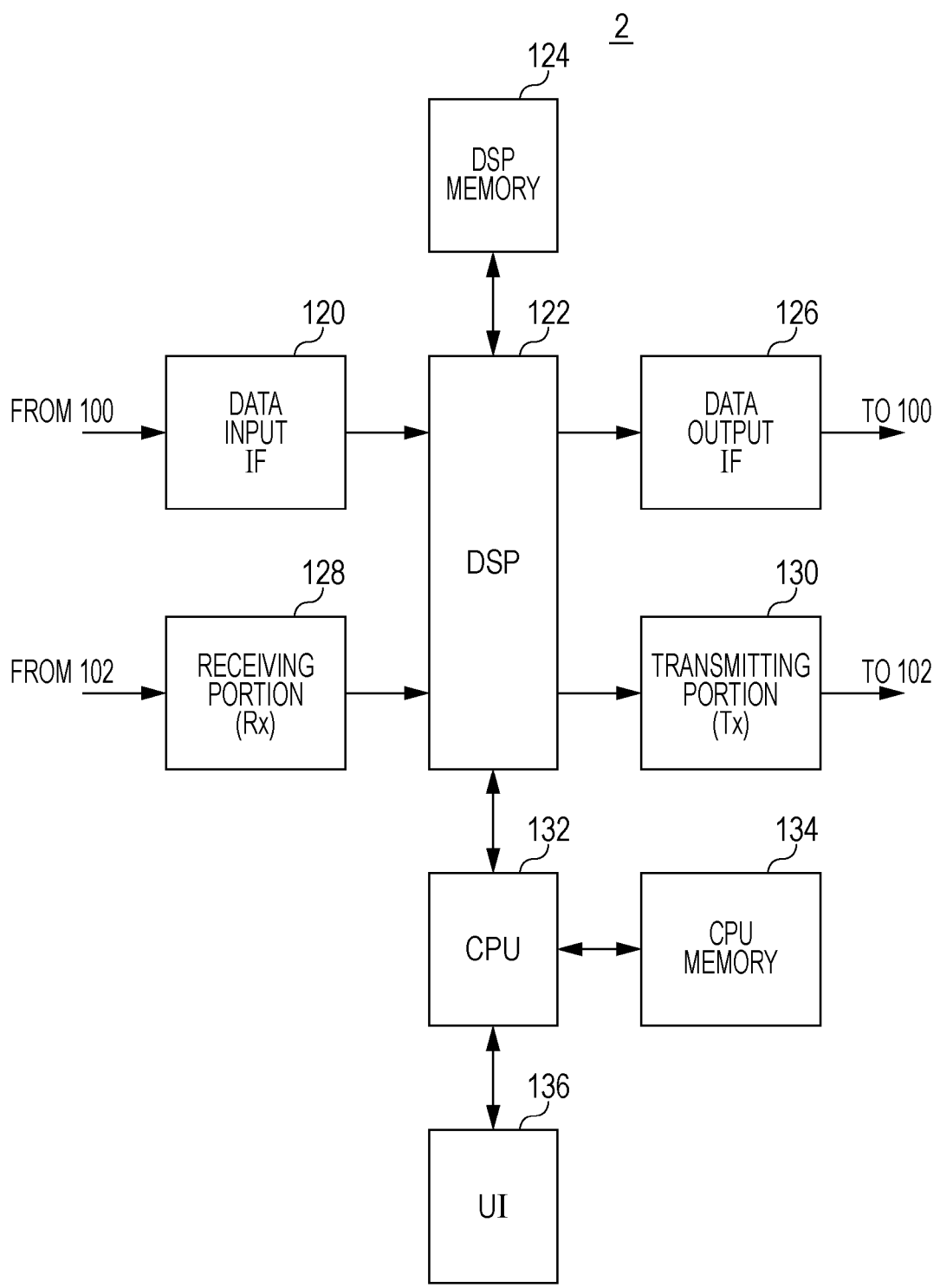
FIG. 5 is a diagram showing a hardware configuration of the communication apparatus shown in FIG. 3.

FIG. 5 is a diagram showing a hardware configuration of the communication apparatus 2 shown in FIG. 3.

As shown in FIG. 5, the communication apparatus 2 includes a data input interface (IF) 120, a DSP 122, a DSP memory 124, a data input interface 126 that receives and transmits message data from and to the information processing apparatus 100, a receiving portion (Rx) 128, a transmitting portion 130 (Tx), a CPU 132, a CPU memory 134 and a user interface portion 136.

The source the communication apparatus 2 receives message data from those components, creates a transmit signal in CR-PC/HC-MCM and transmits it to the destination communication apparatus 2 through a radio transmission path.

The destination communication apparatus 2 receives the transmit signal in CR-PC/HC-MCM from the source communication apparatus 2 through the radio transmission path, combines it with message data and outputs the result to the information processing apparatus 100.

For clear and concrete description, the case where the processing by the communication apparatus 2 is implemented by software will be illustrated below. However, the processing by the communication apparatus 2 may be implemented by special hardware or a combination of special hardware and software.

Illustrating the configuration in FIG. 3 in which the communication apparatus 2 has the DSP 122 and the CPU 13, the communication apparatus 2 may have either one of them in accordance with some specifications of and requested performance by the communication apparatus 2.

In the communication apparatus 2, the data input interface 120 receives message data from the information processing apparatus 100 and outputs it to the DSP 122.

The receiving portion 128 transforms a transmit signal at a transmission frequency band, which is received from the communication apparatus 2 of the other communication party through the antenna 102 to a transmit signal at a baseband in an analog form and outputs the result to the DSP 122.

The DSP 122 has an analog/digital transforming device and a digital/analog transforming device (not shown) and executes transmission and reception programs (which will be described later with reference to FIG. 6 and FIG. 8) modulates the message data in a digital form, which is input from the information processing apparatus 100 with CR-PC/HC-MCM, creates a transmit signal at the baseband, and outputs it to the transmitting portion 130.

The transmitting portion 130 transforms the transmit signal in CR-PC/HC-MCM at the baseband in a digital form, which is input from the DSP 122, to a transmit signal at a transmission frequency band, and transmits it to the communication apparatus 2 of the other communication party through a communication line such as a radio transmission path.

The CPU 132 executes a program stored in the CPU memory 134 controls the components of the communication apparatus 2 in accordance with an operation by a user on the user interface portion 136.

[Transmission Program]

A transmission program 30 that creates and transmits a transmit signal in CR-PC/HC-MCM will be described below.

Figure 6:
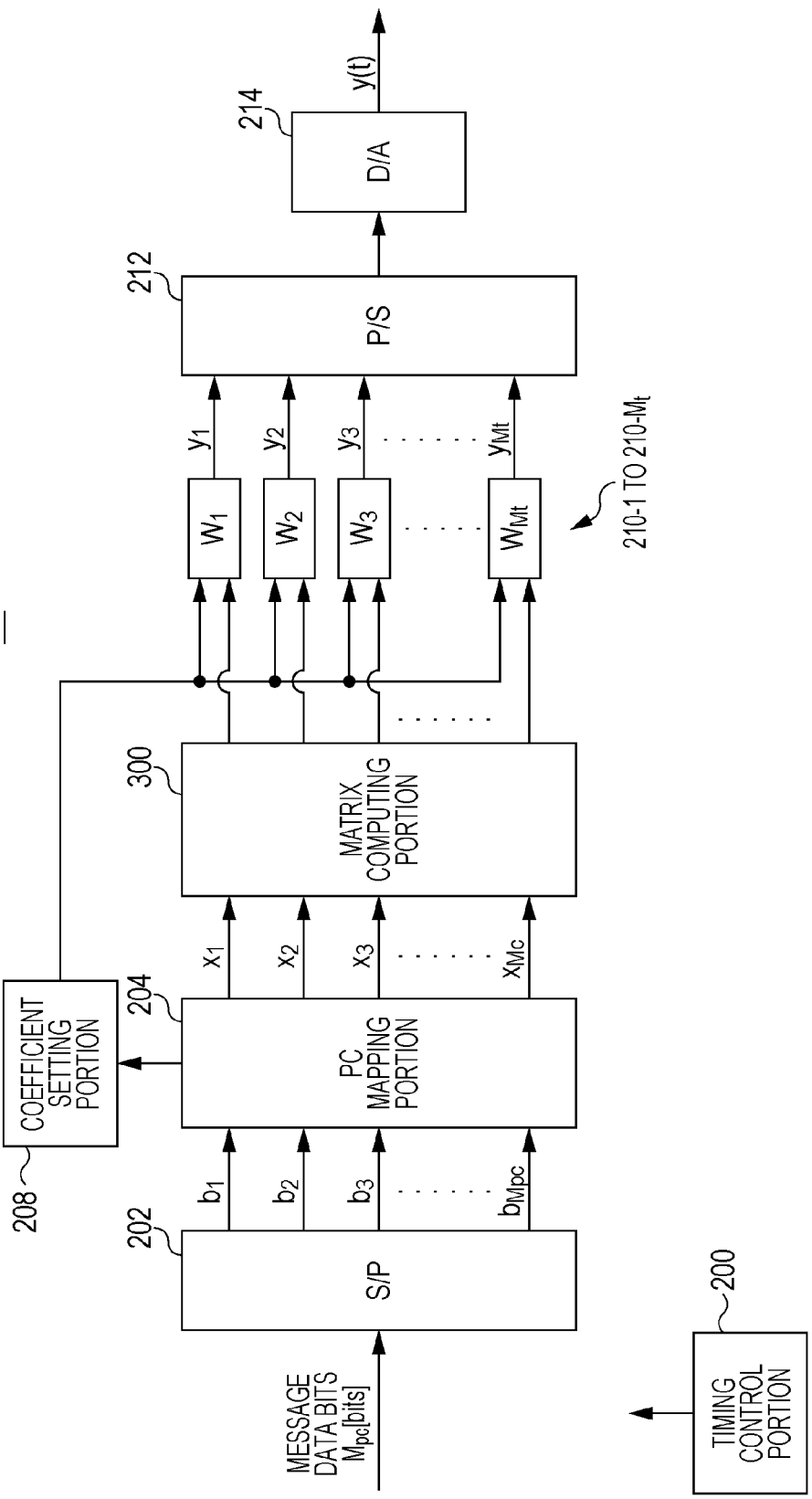
FIG. 6 is a diagram showing the configuration of the transmission program to be executed in the source communication apparatus shown in FIG. 3.

FIG. 6 is a diagram showing the configuration of the transmission program 30 to be executed in the source communication apparatus 2 shown in FIG. 3.

As shown in FIG. 6, the transmission program 30 includes a timing control portion 200, an S/P 202, a PC mapping portion 204, a matrix computing portion 300, a coefficient setting portion (F) 208, multiplexing portions 210-1 to 210-M$_t$, a P/S 212 and a D/A 214.

In other words, the transmission program 30 includes a matrix computing portion 300 which replaces the IDFT portion 206 in the transmitter 20 shown in FIG. 1. The matrix computing portion 300 has the same function as that of the IDFT portion 206.

The transmission program 30 may be supplied to the communication apparatus 2 over a network, for example, and through the information processing apparatus 100, is loaded to the DSP memory 304 or CPU memory 314, is executed by concretely using a hardware resource in the communication apparatus 2 on an OS (not shown) that operates in the DSP 302 or CPU 312 (and the same is true for the following programs).

The transmission program 30 uses those components to modulate the message data input from the information processing apparatus 100 with CR-PC/HC-MCM and creates transmit data at a baseband in an analog form.

Notably, the numerical values Mp, $M_c$, $M_{pc}$ and $M_t$ to be used in the transmission program 30 and reception program 34 may be adjusted and be optimized on the basis of calculations or actual measurement in accordance with the tradeoffs among the processing by the communication apparatus 2, the capability, the BER characteristic and the spectrum efficiency.

FIG. 7 is a table illustrating the symbol $x_B$ acquired by mapping by the PC mapping portion 204 in the transmission program 30 shown in FIG. 6.

FIG. 7 shows a concrete example in a case where the bit count of message data is $M_{pc}=4$, the total number of carrier waves is $M_c=8$, the number of selected carrier waves is $M_p=2$, and the bit count of the symbol is $M_t=8$ ((where $M_c/M_p)=(8/2)$).

The differences between the transmitter 20 and the transmission program 30 will be described below.

In the transmission program 30, the PC mapping portion 204, as in the transmitter 20, maps $M_{pc}$-bit message data externally input through the data input IF 120 and transformed to a parallel form by the S/P 202 to $M_t$ bit symbol $x_B=[x_1 \text{ to } x_{Mt}$ (in FIG. 7, $x_1$ to $x_8$)$]^T$ (where T indicates transposition).

In the concrete example shown in FIG. 7, the PC mapping portion 204 maps 4 ($M_{pc}$) bit message data (0001 to 1111) to a combination of two carrier waves selected from 8 ($M_c$) carrier waves and creates 8 ($M_c$) bit symbol $x_B=[x_1 \text{ to } x_8]^T$ including 1 of 2 ($M_p$) bits and 0 of 6 ($M_c-M_p$) bits.

Notably, the PC mapping portion 204 in the transmission program 30 outputs the symbol $x_B$ to the matrix computing portion 300 without adding $K_0$ bits of the value 0, unlike in the transmitter 20.

The matrix computing portion 300 performs transformation (which is the first transformation) on the symbol $x_B=[x_1 \text{ to } x_c]^T$ input from the PC mapping portion 204 by multiplying it with the $M_c \times M_t$ matrix F, which transforms them to $M_t$ complex samples $y=[y_1 \text{ to } y_{Mt}]^T$ expressed by Expression 10, and outputs the sample $y=[y_1 \text{ to } y_{Mt}]^T$ acquired as $Fx_B$ as a result of the multiplication to the multiplexing portion 210-1 to 210-M$_t$, respectively.

$$F = \begin{bmatrix} \omega_{1,1} & \cdots & \omega_{1,M_c} \\ \vdots & \ddots & \vdots \\ \omega_{M_t,1} & \cdots & \omega_{M_t,M_c} \end{bmatrix} \quad \text{[Expression 10]}$$

However, the elements of the matrix F are defined by Expression 11.

$$\omega_{m,l} = \frac{1}{\sqrt{M_c+M_0}} e^{j\frac{2\pi(l-1)(m-1)}{M_c+M_0}} \quad \text{[Expression 11]}$$

The multiplexing portion 210-1 to 210-M$_t$ multiply the elements of the sample $y=[y_1 \text{ to } y_{Mt}]^T$ by the coefficients $w_1$ to $w_{Mt}$ (refer to Expression 7), respectively, created by the coefficient setting portion 208.

The sample $y=[y_1$ to $y_{Mt}]^T$ acquired as the multiplication result by the multiplexing portion 210-1 to 210-M$_t$ is represented as $WFx_B$ by using the $M_t \times M_t$ diagonal matrix W expressed in Expression 12.

$$W = \text{diag}[w_1, w_2, \ldots, w_{Mt}] \quad \text{[Expression 12]}$$

$$= \begin{bmatrix} w_1, & & & 0 \\ & w_2, & & \\ & & \ddots & \\ 0 & & & , w_{Mt} \end{bmatrix}$$

Figure 8:
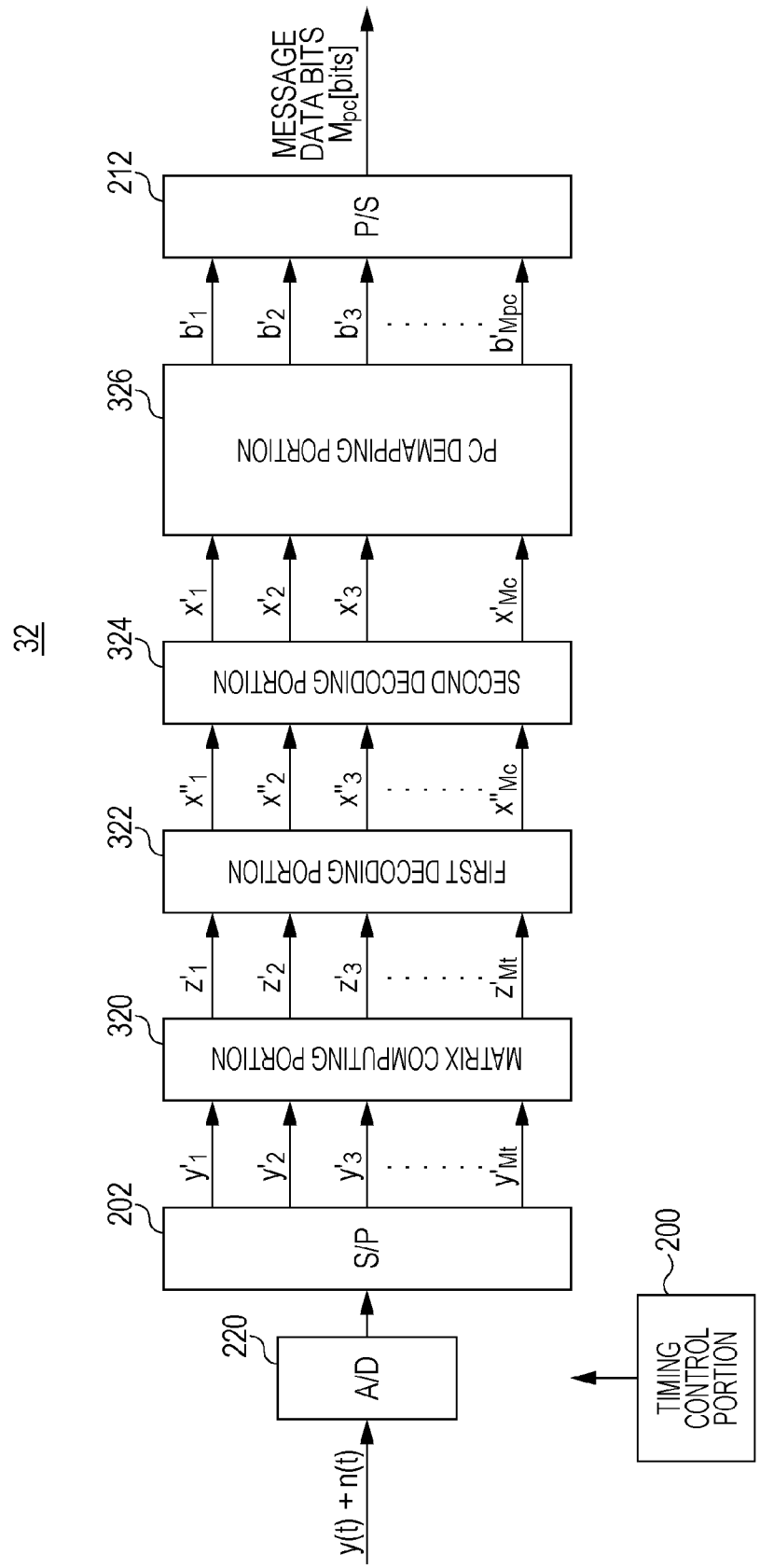
FIG. 8 is a diagram showing the configuration of the reception program to be executed in the destination communication apparatus shown in FIG. 3.

Notably, the matrices F and W expressed in Expression 10 and Expression 11 have a relationship of WF=QR between complex conjugate transposition matrix Q (in Expression 13) in an $M_t \times M_t$ unitary matrix $Q^H$, which is to be used for transforming the sample $y'=[y'_1$ to $y'_{Mt}]$ included in the received transmit signal to symbol $z'=[z'_1$ to $z'_{Mc}]$, and the $M_t \times M_c$ upper triangular matrix R (in Expression 14), which is acquired in accordance with the value of the multiplication result WF, in a reception program 32, which will be described later with reference to FIG. 8.

Notably, as described above, H refers to a complex conjugate transposition of a matrix, and $Q^H=Q^{-1}$ (where $Q^{-1}$ is the inverse matrix of Q) because the matrix Q is a unitary matrix as described above.

For clear description, the matrices Q and R will be described which is used when the matrix W is not considered, that is, when the coefficient setting portion 208 and multiplexing portion 210 are omitted in the transmission program 30.

$$Q = \begin{bmatrix} q_{1,1} & \cdots & q_{1,M_t} \\ \vdots & \ddots & \vdots \\ q_{M_t,1} & \cdots & q_{M_t,M_t} \end{bmatrix} \quad \text{[Expression 13]}$$

$$R = \begin{bmatrix} a_{1,1} & a_{1,2} & \cdots & a_{1,M_c} \\ 0 & a_{2,2} & \ddots & \vdots \\ \vdots & \ddots & \ddots & \vdots \\ 0 & 0 & \ddots & a_{M_c,M_c} \\ \vdots & \vdots & \ddots & \vdots \\ 0 & 0 & \cdots & 0 \end{bmatrix} \begin{matrix} (1) \\ (2) \\ \vdots \\ (M_c) \\ \vdots \\ (M_t) \end{matrix} \quad \text{[Expression 14]}$$

The sample $y=[y_1$ to $y_{Mt}]$ created in the manner described above are transformed to transmit signal at the baseband y(t) by the P/S 212 and D/A 214, are further transformed to the transmit signal compliant with the communication line by the transmitting portion 130 (in FIG. 5) and are transmitted to the destination communication apparatus 2 through the antenna 102 (in FIG. 3).

As described above, unnecessary signal component n(t) such as AWGN is superimposed on the transmit signal, on the communication line, and the resulting transmit signal are received as transmit signal y'(t)=y(t)+n(t) by the destination communication apparatus 2.

[Reception Program]

The reception program 32 that decodes message data bits from the transmit signal in CR-PC/HC-MCM will be described below.

FIG. 8 is a diagram showing the configuration of the reception program 32 to be executed in the destination communication apparatus 2 shown in FIG. 3.

As shown in FIG. 8, the reception program 32 includes a timing control portion 200, an S/P 202, a matrix computing portion 320, a first decoding portion 322, a second decoding portion 324 and a PC demapping portion 326.

In other words, the reception program 32 includes the matrix computing portion 320, first decoding portion 322, second decoding portion 324 and PC demapping portion 326, which replace the DFT 222 and the decision portion 224 in the receiver 22 (in FIG. 2).

The transmit signal received from the source the communication apparatus 2 through the communication line and antenna 102 (in FIG. 3) are transformed to the transmit signal at the baseband y'(t)=y(t)+n(t) by the receiving portion 128. The A/D 220 and S/P 202 outputs the transmit signal y'(t)=y(t)+n(t) to the matrix computing portion 320 as sample $y'=WFx_B+\eta=[y'_1$ to $y'_{Mt}]$ (where $\eta$ is an $M_t \times 1$ vector indicating an unnecessary signal component) in a parallel form.

The matrix computing portion 320 transforms the sample y' (second transformation) by multiplying them by the complex conjugate transposition matrix $Q^H$ in the unitary matrix and outputs the sample $z'=Q^H(WFx_B+\eta)=Q^HWFx_B+Q^H\eta=[z'_1$ to $z'_{Mc}]^T$ acquired as the multiplication result to the first decoding portion 322.

The information matrices F and W are shared between the transmission program 30 and the reception program 32. In advance, the first decoding portion 322 acquires the matrix Q (by Expression 13) and matrix R (by Expression 14) in accordance with the value of the matrix F (WF in reality by Expression 11 and Expression 12) to be used in the transmission program 30 and further acquires the replica symbol $Rx_{Bi}$ which is acquired by multiplying all possible symbol $x_{Bi}=[x_{i1}$ to $x_{Mc}]^T$ by the matrix R, as expressed in Expression 15.

The replica symbol $Rx_{Bi}$ can be defined as the result $Q^HQRx_{Bi}=Q^{-1}QRx_{Bi}=Rx_{Bi}$ ($WFx_{Bi}$ in reality) of the multiplication of the symbol $x_Bi=[x_{i1}$ to $x_{iMc}]^T$ created by the PC mapping portion 204 in the transmission program 30 by the matrix F and the multiplication of the multiplication result $Fx_Bi$ ($WFx_{Bi}$ in reality)=$QRx_{Bi}$ ($QWFx_{Bi}$ in reality) by the complex conjugate transposition matrix $Q^H(=Q^{-1})$ in the matrix Q without not superimposition of an unnecessary signal component thereon.

$$Rx_{B_i} = \begin{bmatrix} a_{1,1}x_{i,1} + \ldots + a_{1,M_c}x_{i,M_c} \\ \vdots \\ \vdots \\ \vdots \\ a_{M_c-1,M_c-1}x_{i,M_c-1} + a_{M_c-1,M_c}x_{i,M_c} \\ a_{M_c,M_c}x_{i,M_c} \\ 0 \\ \vdots \\ 0 \end{bmatrix} \begin{matrix} (M_c) \\ \vdots \\ (M) \\ \vdots \\ (2) \\ (1) \\ \\ \\ \end{matrix} \quad \text{[Expression 15]}$$

Notably, in Expression 15, $x_{i,l}$ (where l=1 to $M_c$) is the lth element in the vector $x_{Bi}$.

[Decoding Processing by First Decoding Portion 322]

Figure 9:
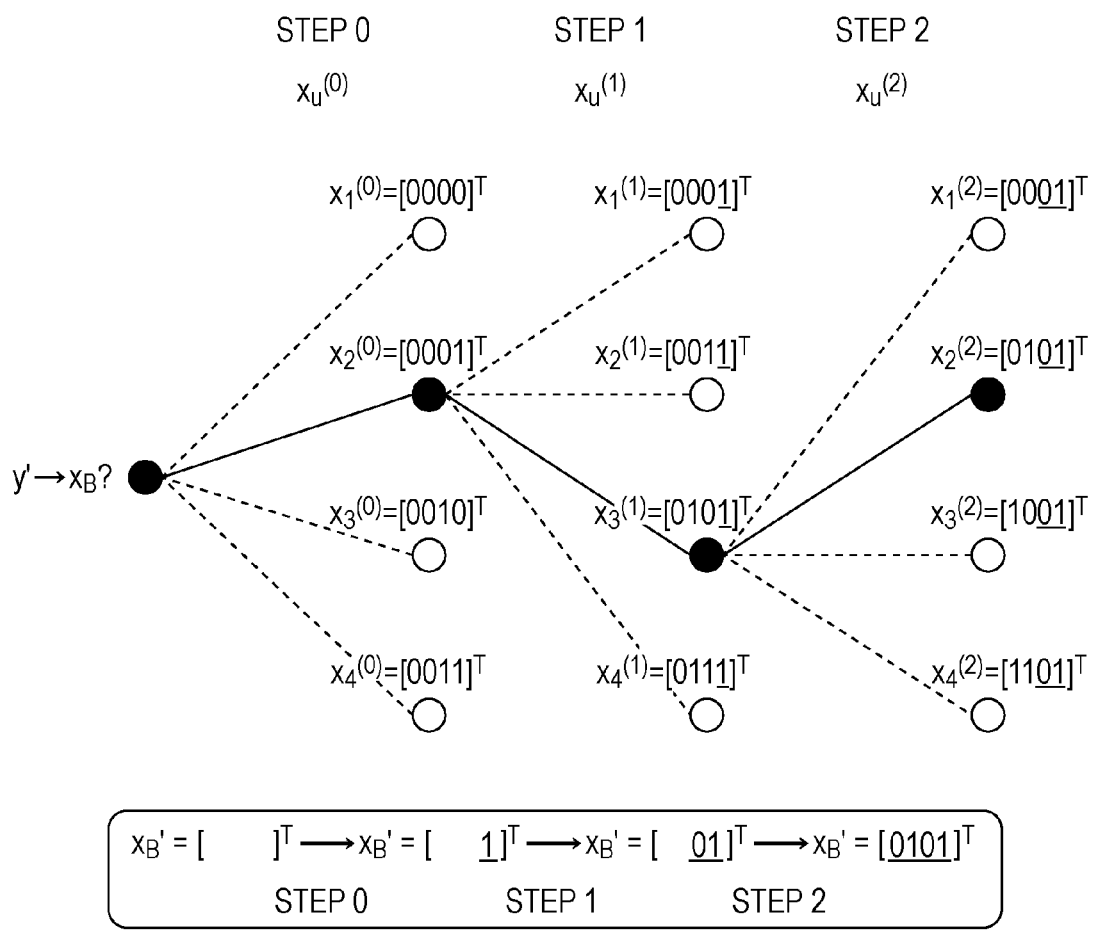
FIG. 9 is a diagram illustrating an M-algorithm to be used in decoding processing by the first decoding portion in the reception program shown in FIG. 8.

FIG. 9 is a diagram illustrating an M-algorithm to be used in decoding processing by the first decoding portion 322 in the reception program 32 shown in FIG. 8.

Notably, FIG. 9 shows the processing where $M_c=4$, $M_p=2$ and $M=2$ as a concrete example.

[Outline of Decoding Processing]

First of all, the outline of the decoding processing applying M-algorithm by the first decoding portion 322 will be described. The decoding processing applying M-algorithm by the first decoding portion 322 is performed through step 1 to step $(M_c-M)$ below.

[Step 1] The set of vector $x_u^{(0)}$ expressed in Expression 16 is multiplied by the matrix R and is handled as the first set $Rx_u^{(0)}$ of replica symbol in M-algorithm expressed in Expression 16.

The set of replica symbol $Rx_u^{(0)}$ is used to perform the maximum likelihood decoding expressed in Expression 17, whereby bit values $x'_{Mc}$ are acquired.

Furthermore, the set of vector $x_u^{(1)}$ including the bit values $x'_{Mc}$ acquired by the processing as the lowest element as expressed in Expression 18 is created.

[Step 2] The created set of vector $x_u^{(1)}$ is multiplied by the matrix R, the second set of replica symbol $Rx_u^{(1)}$ is created.

The second set of replica symbol $Rx_u^{(1)}$ is used to perform the maximum likelihood decoding expressed in Expression 17, whereby bit values $x'_{Mc}-1$ is acquired.

Furthermore, the set of vector $x_u^{(2)}$ including the bit values $x'_{Mc}$ to $x'_{Mc-1}$ acquired by the processing as the lowest and second elements as expressed in Expression 18 is created.

[Step $(M_c-M-1)$] The processing in steps 1 and 2 above is performed $M_c-M-2$ times, the set of vector $x_u^{(Mc-M-2)}$ created by the $(M_c-M-2)$th processing is multiplied by the matrix R, whereby the $(M_c-M-1)$th set of replica symbol $Rx_u^{(Mc-M-2)}$ is created.

The $(M_c-M-1)$th set of replica symbol $Rx_u^{(Mc-M-2)}$ is used to perform the maximum likelihood decoding, which is similar to the first and second ones, whereby the bit values $x'_{Mc-M-2}$ is acquired.

Furthermore, the set of vector $x_u^{(Mc-M-1)}$ including the bit values $x'_{Mc}$ to $x'_{Mc-M-2}$ acquired by the processing as the first to $(M_c-M-1)$th elements from the bottom is created.

[Step $(M_c-M)$] Up to this point, the processing in steps 1 to $(M_c-M-1)$ is performed, and when M elements are included in the symbol $Rx_u^{(Mc-M-1)}$, the maximum likelihood decoding is performed on the entire M elements. Then, all of the bit values of the symbol are decoded.

[Details of Decoding Processing]

The decoding processing by the first decoding portion 322 will be described in further details below.

The first decoding portion 322 uses M-algorithm to perform decoding processing on the symbol $z'=[z'_1$ to $z'_{Mc}]^T$ input from the matrix computing portion 320 as described below.

First of all, as in the 0th step in FIG. 9, all $(U_0)$ bit arrays of the $(M_c-M)$th to $M_c$th M elements $(x_{i,Mc-M}$ to $x_{i,Mc})$ of the symbol $x_{Bi}=[x_{i,1}$ to $x_{i,Mc}]^T$ are prepared, and $M_c-M_0$ are added to the upper parts of all of them, whereby the $M_c \times 1$ vector $x_u^{(0)}$ (where $u=1, 2, \ldots, U_0 \leq 2^M$) expressed in Expression 16 are created.

$$x_u^{(0)} = \begin{bmatrix} \overbrace{0\ 0\ \ldots\ 0}^{M_c-M0s} & \overbrace{x_{u,M_c-M}\ x_{u,M_c-M+1}\ \cdots\ x_{u,M_c}}^{M\ elements} \end{bmatrix}^T \quad \text{[Expression 16]}$$

The first decoding portion 322 further performs computing in Expression 17, and the values of the $M_c$th bits of the symbol $x_{Bi}=[x_{i,1}$ to $x_{i,Mc}]^T$ are acquired.

$$x'_{M_c} = x_{u,M_c} = \underset{u}{\mathrm{argmin}}(\|Q^H y' - Rx_u^{(0)}\|) \quad \text{[Expression 17]}$$

Next, in the first step in FIG. 9, the first decoding portion 322 handles the value of the bit acquired in the 0th step as the $M_c$th element $x'_{Mc}$, prepares all $(U_1)$ bit arrays of the $(M_c-M-1)$th to $(M_c-1)$th M elements $(x_{i,\ Mc-M-1}$ to $x_{i}$ and $_{Mc-1})$ of the symbol $x_{Bi}=[x_{i,1}$ to $X_{i,Mc}]^T$, adds $M_c-M-1$ 0 s to the upper parts of all of them, creates the $M_c \times 1$ vector $x_u^{(1)}$ ($u=1, \ldots, U_1 \leq 2^M$) in the configuration expressed in Expression 18.

$$x_u^{(1)} = \begin{bmatrix} \overbrace{0\ 0\ \ldots\ 0}^{M_c-M-10s} & \overbrace{x_{u,M_c-M-1}\ x_{u,M_c-M-2}\ \cdots\ x_{u,M_c-1}}^{M\ elements} & x'_{M_c} \end{bmatrix}^T \quad \text{[Expression 18]}$$

Furthermore, the first decoding portion 322 performs the computing in Expression 19 and acquires the value of the $(M_c-1)$th bit in the symbol $x_{Bi}=[x_{i,1}$ to $x_{i,Mc}]^T$.

$$x'_{M_c-1} = x_{u,M_c-1} = \underset{u}{\mathrm{argmin}}(\|Q^H y' - Rx_u^{(1)}\|) \quad \text{[Expression 19]}$$

Sequentially in the nth step (where $n=1$ to $M_c-M$), the first decoding portion 322 further handles the value of the bit acquired up to the $(n-1)$th step as the $M_c$th to $M_{c-n-1}$th elements $x'_{Mc}$ to $x'_{Mc-n-1}$, prepares all $(U_n)$ bit arrays of the $(M_c-M-n)$ th to $(M_c-n)$ th M elements $(x_i,\ _{Mc-M-n}$ to $x_i$ and $_{Mc-n})$ of the symbol $x_{Bi}=[x_{i,1}$ to $x_{i,Mc}]^T$, adds $M_c-M-n$ 0 s to the upper parts of all of them, and creates an $M_c \times 1$ vector $x_u^{(n)}$ ($u=1, 2, \ldots, U_n \leq 2^M$).

The first decoding portion 322 further performs the computing in Expression 20 and acquires the value of the $(1-M)$th bit of the symbol $x_{Bi}=[x_{Bi1}$ to $x_{BiMc}]^T$.

Notably, in the final $(n=M_c-M)$th step, the values of the first to $M_t$h bits of the symbol $x_{Bi}=[x_{i,1}$ to $x_{i,Mc}]^T$ are acquired by one operation.

$$x'_{M_c-n} = x_{u,M_c-n} = \underset{u}{\mathrm{argmin}}(\|Q^H y' - Rx_u^{(n)}\|) \quad \text{[Expression 20]}$$

As described above, the first decoding portion 322 performs the processing in the 0th to $(M_c-M)$th steps, and finally demodulates all elements of $x_{Bi}$ from the symbol $z'=[z'_1$ to $z'_{Mc}]^T$, acquires the symbol $x''=[x''_1$ to $x''_{Mc}]^T$, and outputs them to the second decoding portion 324.

Notably, the amount of computing required by the first decoding portion 322 for performing the maximum likelihood decoding in the 0th to the $(M_c-M)$th steps by using groups of M elements of the symbol $x_{Bi}=[x_{i,1}$ to $x_{i,Mc}]^T$ is remarkable less than the amount of computing for performing maximum likelihood decoding on all of the elements of the symbol $x_{Bi}=[x_{i,1}$ to $x_{i,Mc}]^T$ at one time.

When the values of $M_p$ bits are 1 and the values of the other bits are 0 among $M_c$ bits of the symbol $x''=[x''_1$ to $x''_{Mc}]^T$, the bit count of the value 1 in the symbol $x=[x_1$ to $x_{Mc}]^T$ created by the PC mapping portion 204 in the transmission program 30 agrees with the bit count of the value 0. Therefore, there is a high possibility that the symbol $x''=[x''_1$ to $x''_{Mc}]^T$ are equal to $x=[x_1 \text{ to } x_{Mc}]^T$ created from $M_{pc}$-bit message data input from the transmission program 30.

On the other hand, except for the time when the values of $M_p$ bits are 1 and the values of the other bits are 0 among $M_c$ bits in the symbol $x''=[x''_1 \text{ to } x''_{Mc}]^T$, the bit count of the value 1 in the symbol $x=[x_1 \text{ to } x_{Mc}]^T$ created by the PC mapping portion 204 in the transmission program 30 agrees with the bit count of the value 0. Therefore, there are no possibilities that the symbol $x''=[x''_1 \text{ to } x''_{Mc}]^T$ are equal to $X=[x_1 \text{ to } x_{Mc}]^T$ created from $M_{pc}$-bit message data input from the transmission program 30.

[Case where the Decoding Result by First Decoding Portion is Determined as Right by Second Decoding Portion]

The second decoding portion 324 determines, in accordance with the fact described above, whether the values of $M_p$ bits are 1 and the values of the other bits are 0 among $M_c$ bits in the symbol $x''=[x''_1 \text{ to } x''_{Mc}]^T$ input from the first decoding portion 322 or not, decodes the symbol $x'=[x'_1 \text{ to } x'_{Mc}]^T$ being the final decoding result and outputs them to the PC demapping portion 326.

In other words, when the values of $M_p$ bits are 1 and the values of the other bits are 0 among the $M_c$ bits in the symbol $x''=[x''_1 \text{ to } x''_{Mc}]^T$, the second decoding portion 324 outputs the symbol $x''=[x''_1 \text{ to } x''_{Mc}]^T$ input from the first decoding portion 322 to the PC demapping portion 326 as the symbol $x'=[x'_1 \text{ to } x'_{Mc}]^T$ being the final decoding result.

Figure 10:
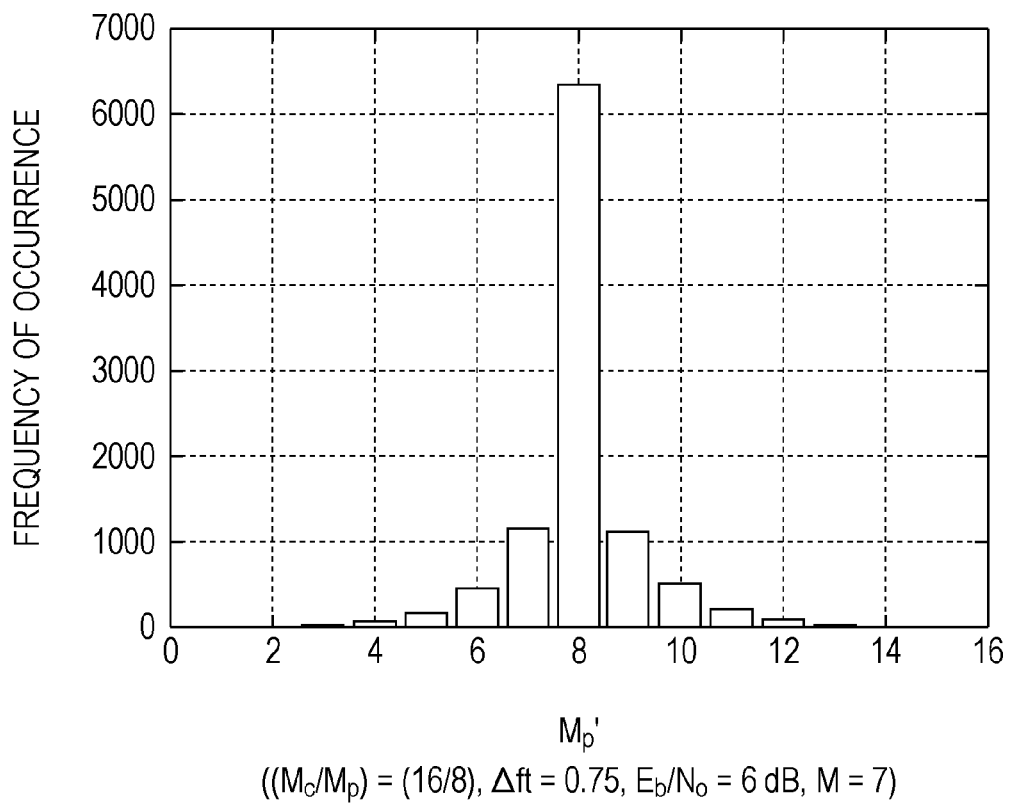
FIG. 10 is a histogram illustrating the results of acquisition of the frequencies of appearance by a computer simulation of the bit count of the value 1 included in the symbol $x''=[x''_1$ to $x''_{Mc}]^T$ in the decoding result by the first decoding portion 322 shown in FIG. 7.

FIG. 10 is a histogram illustrating the results of acquisition of the frequencies of appearance by a computer simulation of the bit count of the value 1 included in the symbol $x''=[x''_1 \text{ to } x''_{Mc}]^T$ in the decoding result by the first decoding portion 322 shown in FIG. 7.

However, FIG. 10 shows the case where $M_c=16$, $M_p=8$, $\Delta fT=0.75$, $E_b/N_0=6$ bB, and $M=7$.

FIG. 10 shows that there is a significantly high probability that the decoding result can be acquired by the first decoding portion 322, which has a high possibility that the symbol $x''=[x''_1 \text{ to } x''_{Mc}]^T$ by the first decoding portion 322 includes $M_p$ bits with the value 1 and are equal to the symbol $x=[x_1 \text{ to } x_{Mc}]^T$ created by th PC mapping portion 204 in the transmission program 30 (in FIG. 6).

Therefore, in this case, the frequency requiring the maximum likelihood decoding in the second decoding portion 324 is significant low, and mostly, a less amount of computing by the first decoding portion 322 is required to decode the symbol $x'=[x'_1 \text{ to } x'_{Mc}]^T$.

When, among $M_c$ bits of the symbol $x''=[x''_1 \text{ to } x''_{Mc}]^T$, the values of $M_p$ bits are 1 and the values of the other bits are 0, the second decoding portion 324 acquires the symbol $x''=[x''_1 \text{ to } x''_{Mc}]^T$ from the first decoding portion 322, handles them directly as the symbol $x'=[x'_1 \text{ to } x'_{Mc}]^T$ and outputs the result to the PC demapping portion 326.

[Case where Second Decoding Portion Determines that the Decoding Result by First Decoding Portion is Wrong]

On the other hand, when the bit count of the value 1 actually included in the symbol $x''=[x''_1 \text{ to } x''_{Mc}]^T$ decoded by the first decoding portion 322 is $M'_p$ and $M_p<M'_p$, unnecessary bits of the value 1 of $N_1=M'_p-M_p$ are included.

Therefore, by replacing the value 1 of $N_1$ bits by the value 0, the symbol $x''=[x''_1 \text{ to } x''_{Mc}]^T$ acquired by the first decoding portion 322 can be brought closer to $x=[x_1 \text{ to } x_{Mc}]^T$.

However, when $N_1$ is high, the number of replacement methods from the value-1 bits to the value-0 bits in $x''=[x''_1 \text{ to } x''_{Mc}]^T$ increases. Therefore, practically, the upper limit of the bit count for the replacement is preferably limited by the replacement depth d (where $d \leq N_1$).

Notably, when $d=N_1$, all possible replacements are to be performed.

The newly created vector (set) as a result of the replacement in this way is $x_B^{(v)}$, and the symbol $x'=[x'_1 \text{ to } x'_{Mc}]^T$ can be acquired by Expression 21 below.

$$x' = \underset{v}{\arg\min}(\|Q^H y - Rx_B^{\prime(v)}\|) \qquad \text{[Expression 21]}$$

In such a case, the number of $x_B^{(v)}$s to be compared with the symbol $z'=[z'_1 \text{ to } z'_{Mc}]^T$ is $(M'_p/d)$. Thus, even when the decoding by the second decision portion 324 is added to the decoding processing only by the first decoding portion 322, the amount of computing does not largely increase.

Notably, when $M_p>M'_p$, $N_2=M_p-M'_p$ value-1 bits are lacking.

Therefore, by replacing $N_2$ value-0 bits by the value 1, the symbol $x''=[x''_1 \text{ to } x''_{Mc}]^T$ acquired by the first decoding portion 322 can be brought closer to $x=[x_1 \text{ to } x_{Mc}]^T$.

Also in this case, it is effective to limit the bit count for the replacement by the replacement depth d ($d \leq N_2$), and the number of $x_B^{(v)}$s to be compared with the symbol $z'=[z'_1 \text{ to } z'_{Mc}]^T$ is $(M_c-M'_p/d)$. Therefore, even when the decoding by the second decision portion 324 is added to the decoding processing only by the first decoding portion 322, the amount of computing is not largely increased.

Therefore, even when the decoding is performed by the second decoding portion 324, the increment from the amount of computing by the first decoding portion 322 is small.

The PC demapping portion 326 performs the processing corresponding to the PC mapping portion 204 in the transmission program 30 (in FIG. 6), creates the $M_{pc}$-bit message data corresponding to $x'=[x'_1 \text{ to } x'_{Mc}]^T$ acquired as the result of the decoding, and outputs it to the P/S 212 in a parallel form.

The P/S 212 transforms the message data input from the PC demapping portion 326 to the one in a serial form and externally outputs the result through the data output IF 126.

[Overall Operations by Communication System 1]

Taking the case where the communication apparatus 2-1 is the source (Tx) and the communication apparatus 2-2 is the receiver side (Rx) as an example, the overall operations by the communication system 1 (in FIG. 3) will be described below.

[Transmission Operation]

The PC mapping portion 204 of the transmission program 30 (FIG. 6) that operates in the communication apparatus 2-1 maps the $M_{pc}$-bit message data externally input through the data input IF 120 and transformed to the one in a parallel form by the S/P 202 to $M_t$ bit symbol $x_B=[x_1 \text{ to } x_{Mt}]^T$.

The matrix computing portion 300 multiplies the symbol $x_B=[x_1 \text{ to } x_c]^T$ input from the PC mapping portion 204 by the matrix F expressed in Expression 10 to perform the first transformation, acquires the sample $y=[y_1 \text{ to } y_{Mt}]^T$, and outputs the elements to the multiplexing portions 210-1 to 210-$M_t$.

The multiplexing portions 210-1 to 210-$M_t$ multiply the coefficients $w_1$ to $w_{Mt}$ created by the coefficient setting portion 208 by the elements of the sample $y=[y_1 \text{ to } y_{Mt}]^T$.

Notably, the sample $y=[y_1 \text{ to } y_{Mt}]^T$ acquired as the multiplication result by the multiplexing portion 210-1 to 210-$M_t$ may be transformed to a table form by using the matrix W expressed in Expression 12.

As described above, the matrices F and W expressed in Expression 10 and Expression 11 have a relationship of WF=QR between the complex conjugate transposition matrix Q (in Expression 13) of the matrix $Q^H$ to be used for transformation to the sample $y'=[y'_1$ to $y'_{Mt}]^T$ of the symbol $z'=[z'_1$ to $z'_{Mc}]^T$ in the reception program 32 (in FIG. 8) and the matrix R (in Expression 14).

Like the description on the transmission program 30, the matrices Q and R are used in the case where the coefficient setting portion 208 and multiplexing portion 210 are omitted, for clear description below.

The sample $y=[y_1$ to $y_{Mt}]^T$ are transformed to the transmit signal y(t) at the baseband by the P/S 212 and D/A 214 and are transformed to the transmit signal compatible with the communication line to be used by the transmitting portion 130 (in FIG. 5) and are transmitted to the destination communication apparatus 2-2 through the communication line.

[Reception Operation]

As described above, an unnecessary signal component n(t) is superimposed on transmit signal on a communication line, and the transmit signal are received by the communication apparatus 2-2 as the transmit signal y'(t)=y(t)+n(t).

The A/D 220 and S/P 202 of the reception program 32 (in FIG. 8) operating in the communication apparatus 2-2 transform the transmit signal y' (t)=y(t)+n(t) to the sample $y'=WFx_B+\eta=[y'_1$ to $y'_{Mt}]^T$ in a parallel form and output them to the matrix computing portion 320.

The matrix computing portion 320 multiplies the sample y' by the matrix $Q^H$ to perform the second transformation and outputs the sample $z'=[z'_1$ to $z'_{Mc}]^T$ acquired as the result of the second transformation to the first decoding portion 322.

As described with reference to Expression 16 to Expression 18, the first decision portion 322 repeats the processing of using a group of M elements of the sample $z'=[z'_1$ to $z'_{Mc}]^T$ to decode the $M_c$th to ($M_c$−M−1)th bits on a bit-by-bit basis $M_c$ to $M_c$−M−1 times.

As described with reference to Expression 20, the first decision portion 322 in the final (n=$M_c$−M)th decoding processing collectively decodes the values of the first to Mth bits of the symbol $x_{Bi}=[x_{i,1}$ to $x_{i,Mc}]^T$.

The first decision portion 322 performs the decoding processing to decode all bits of the symbol $x''=[x''_1$ to $x''_{Mc}]^T$ finally.

When the values of $M_p$ bits are 1 and the value of the other bits are 0 among the $M_c$ bits of the symbol $x''=[x''_1$ to $x''_{Mc}]^T$ input from the first decoding portion 322, the second decoding portion 324 transforms the symbol $x''=[x''_1$ to $x''_{Mc}]^T$ input from the first decoding portion 322 to the symbol $x'=[x'_1$ to $x'_{Mc}]^T$, which is the final decoding result.

In other cases, the second decoding portion 324, as described with reference to Expression 21, performs the maximum likelihood decoding on the entire sample $z'=[z'_1$ to $z'_{Mc}]^T$ and acquires the symbol $x'=[x'_1$ to $x'_{Mc}]^T$ as the result.

The second decoding portion 324 outputs the symbol $x'=[x'_1$ to $x'_{Mc}]^T$ acquired by the decoding processing to the PC demapping portion 326.

The PC demapping portion 326 creates the $M_{pc}$-bit message data corresponding to the sample $x'=[x'_1$ to $x'_{Mc}]^T$ acquired as the result of the decoding and outputs it to the P/S 212 in a parallel form.

The P/S 212 transforms the message data input from the PC demapping portion 326 to the one in a serial form and externally outputs the result through the data output IF 126 (in FIG. 5).

[Characteristics of CR-PC/HC-MCM]

The characteristics of CR-PC/HC-MCM will be described below.

Figures 11, 12:
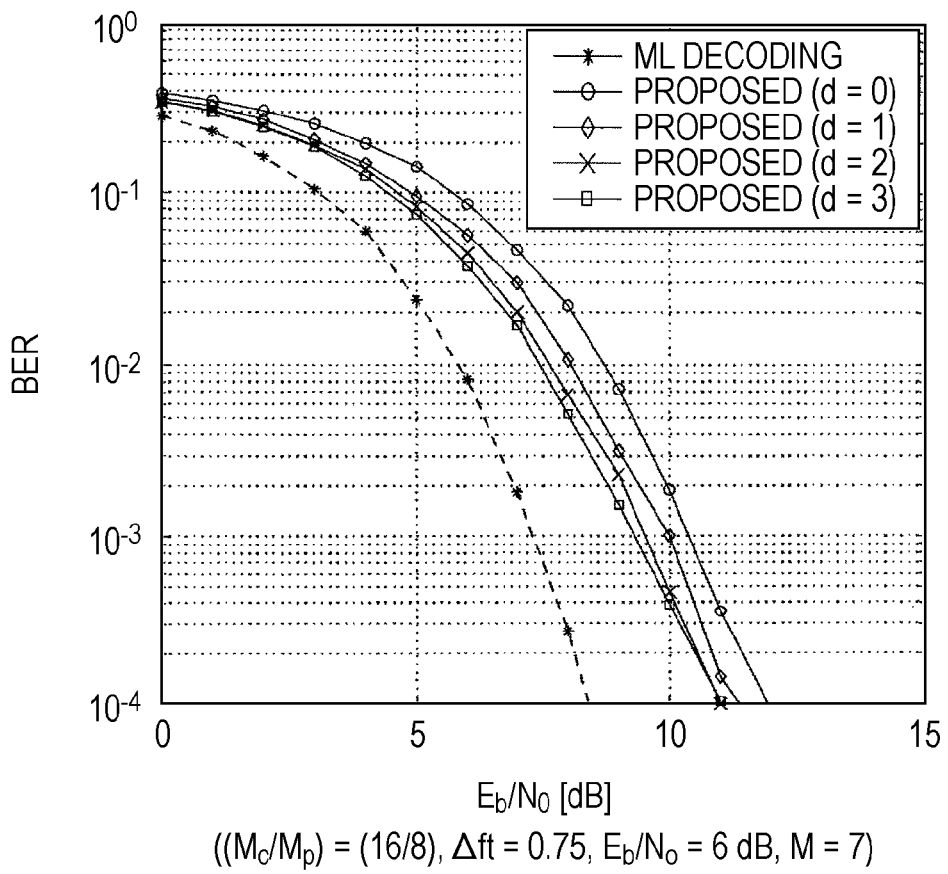
FIG. 11 is a graph showing a relationship between BER values occurring in the symbol x' decoded by the reception program shown in FIG. 7 and the values of $E_b/N_0$.
FIG. 12 shows a table showing the highest amounts of computing for the maximum likelihood decoding by the communication apparatus 2 shown in FIG. 2 and decoding by the first decoding portion 322 and second decoding portion 324 of the reception program 32 shown in FIG. 7.

FIG. 11 is a graph showing a relationship between BER values occurring in the symbol x' decoded by the reception program 32 shown in FIG. 7 and the values of $E_b/N_0$.

Notably, FIG. 11 shows the case where $M_c$=16, $M_p$=8, ΔfT=0.75, and M=7.

As shown in FIG. 11, the BER values of the symbol $x=[x_1$ to $x_{Mc}]^T$ decoded by the reception program 32 from the transmit signal on which an unnecessary signal component is superimposed and the message data to be decoded subsequently become worse to some extent, compared with the case where no unnecessary signal components are superimposed on transmit signal and the destination communication apparatus 2-2 the transmit signal completely to the symbol $x=[x_1$ to $x_{Mc}]^T$ by maximum likelihood decoding.

However, the BER values of the symbol $x'=[x'_1$ to $x'_{Mc}]^T$ decoded by the reception program 32 and the message data to be decoded subsequently are improved as the depth d increases from d=0 (corresponding to the case where maximum likelihood decoding is not performed by the second decoding portion 324) sequentially to d=1 to 3 (corresponding to the case where the second decoding portion 324 performs maximum likelihood decoding within the range that the value of |$N_1$| are 1 to 3 and approach the BER value in the case where maximum likelihood decoding is performed in the communication apparatus 2-2.

FIG. 12 shows a table showing the highest amounts of computing for the maximum likelihood decoding by the communication apparatus 2 shown in FIG. 2 and decoding by the first decoding portion 322 and second decoding portion 324 of the reception program 32 shown in FIG. 7.

FIG. 12 also shows the case where $M_c$=16, $M_p$=8 and M=7.

Both in the receiver 22 and the reception program 32, the highest amount of computing is required for calculating the Euclid distance between the symbol z' and a replica symbol.

As shown in FIG. 12, the amount of computing by the reception program 32 in the case where the depths d=0 to 3 are as significantly low as 1/6.40, 1/6.36, 1/6.18 and 1/5.67, and the increase in amount of computing according to the increase in depth d is less.

The embodiment has been provided for illustration and description purposes only and does not cover all of the embodiments of the claimed invention.

It is not intended that the embodiment limits the technological range of the claimed invention to the disclosed details. The embodiment may be changed and altered in various manners on the basis of the disclosed details.

The embodiment has been selected and been described such that the principle and actual applications of the claimed invention can be described best. Therefore, a person skilled in the art can use the claimed invention and the embodiments by making various changes thereon for optimizing all possible actual applications on the basis of the disclosed details of the embodiment.

It is intended that the technological range of the claimed invention is determined on the basis of the descriptions or equivalents thereof.

The communication system, data decoding apparatus and data receiving method data according to the present invention are applicable for communication.

What is claimed is:

1. A communication system comprising:
a transmitting apparatus; and
a receiving apparatus,
the transmitting apparatus comprising:
a mapper configured to map a predetermined number of bits of transmission objective data to a first symbol, wherein the first symbol represents a combination of a second number of carrier waves that is selected from a first number of total carrier waves that are available for transmission;

a first transformer configured to transform the first symbol into a transmission signal, wherein the transmission signal includes a first sample, wherein the first sample includes a third number of data, wherein the third number is greater than the first number, wherein the first sample is obtained by multiplying a first matrix by a second matrix to obtain a result, wherein the first matrix comprises the first symbol and has a size of the first number by 1 and the second matrix has a size of the first number by the third number, wherein the result multiplied by a diagonal matrix that includes coefficients is equivalent to multiplying a third matrix by a fourth matrix, wherein the third matrix comprises a non-singular matrix in a complex form having a size of the third number by the third number, and wherein the fourth matrix comprises an upper triangular matrix having a size of the third number by the first number;

a multiplier configured to multiply the first sample included in the transmission signal by coefficients; and a transmitter configured to transmit the transmission signal to the receiving apparatus;

wherein the receiving apparatus comprises:

a receiver configured to receive the transmission signal, wherein the received transmission signal includes a different signal component from the transmission signal transmitted by the transmitting apparatus;

a second transformer configured multiply a fifth matrix by a complex conjugate transpose of the third matrix to form a second sample, wherein the fifth matrix comprises the first sample and has a size of the first sample by 1;

a first decoder configured to sequentially perform first decoding on the data included in the second sample;

a second decoder configured to perform second decoding on the second sample such that a symbol acquired by the second decoding is a second symbol; and a demapper that decodes the transmission objective data from the second symbol acquired by the second decoder, wherein the first decoding is implemented by performing maximum likelihood decoding on the second sample and the second decoding is implemented by selecting a combination having a nearest value to the second sample value among combinations of the second sample corresponding to the second symbol.

2. A data decoding apparatus comprising:

a receiver configured to receive a transmission signal, wherein the received transmission signal includes a different signal component from an original transmission signal transmitted by a transmitting apparatus, wherein a first symbol represents a combination of a second number of carrier waves that is selected from a first number of total carrier waves that are available for transmission, and wherein a first sample of the transmission signal is obtained by multiplying a first matrix by a second matrix to obtain a result, wherein the first sample includes a third number of data, wherein the third number is greater than the first number, wherein the first matrix comprises the first symbol and has a size of the first number by 1 and the second matrix has a size of the first number by the third number, wherein the result multiplied by a diagonal matrix that includes coefficients is equivalent to multiplying a third matrix by a fourth matrix, wherein the third matrix comprises a non-singular matrix in a complex form having a size of the third number by the third number, and wherein the fourth matrix comprises an upper triangular matrix having a size of the third number by the first number;

a transformer configured to transform the received transmission signal to a second sample having the third number of data corresponding to the first sample;

a first decoder for sequentially performing first decoding on a third number of data included in the acquired second sample to decode the second symbol corresponding to the first symbol by sequentially decoding parts of the second symbol corresponding to the first symbol;

a second decoder, if the second symbol acquired by the first decoding would include the second number of data, for having the second symbol acquired by the first decoding be the first symbol, or if not, for performing second decoding on all of the data held by the second sample to have the second symbol acquired by the second decoding be the first symbol; and a demapper that decodes transmission target data from the first symbol acquired by the second decoder.

3. The data decoding apparatus according to claim 2, wherein:

the second decoder determines that the second symbol decoded by the first decoding is identical to the first symbol corresponding to the second symbol if the number of value 1 bits included in the second symbol decoded by the first decoding is equal to the second number.

4. The data decoding apparatus according to claim 2, wherein the first decoder performs the first decoding by sequentially selecting a combination having the highest possibility of being identical to a fourth number of data included in the second sample.

5. The data decoding apparatus according to claim 4, wherein the fourth number of all possible combinations of data included in the second sample is acquired by transforming the fourth number of data included in the first symbol to the first sample and performing the transformation by the transformer on the transformed first sample.

6. The data decoding apparatus according to claim 4, wherein the first decoder sequentially performs the first decoding on the fourth number of data excluding the data which has already been handled as a target of the first decoding, to acquire the second symbol.

7. The data decoding apparatus according to claim 4, wherein the second decoder performs the second decoding by selecting a sample having the highest possibility of being identical to the second sample acquired by performing the transformation by the transformer on the second symbol.

8. The data decoding apparatus according to claim 7, wherein:

the third number of data included in the first symbol and the third number of data included in the second symbol comprise a number of bits; and the sample to be selected is all combinations of the second sample corresponding to all of the second symbol acquired such that the difference between the number of value 1 bits included in the second symbol and the number of value 1 bits included in the first symbol is within a predetermined range.

9. The data decoding apparatus according to claim 2, wherein:

the transformer multiplies the inverse matrix of the non-singular matrix by the third number of data of the first sample included in the received transmission signal as a third number×1 vector to transform to the second sample.

10. A data decoding method comprising:

receiving a transmission signal, wherein the received transmission signal includes a different signal component from an original transmission signal transmitted by a transmitting apparatus, wherein a first symbol represents a combination of a second number of carrier waves that is selected from a first number of total carrier waves that are available for transmission, wherein a first sample of the transmission signal is obtained by multiplying a first matrix by a second matrix to obtain a result, wherein the first sample includes a third number of data, wherein the third number is greater than the first number, wherein the first matrix comprises the first symbol and has a size of the first number by 1 and the second matrix has a size of the first number by the third number, wherein the result multiplied by a diagonal matrix that includes coefficients is equivalent to multiplying a third matrix by a fourth matrix, wherein the third matrix comprises a non-singular matrix in a complex form having a size of the third number by the third number, and wherein the fourth matrix comprises an upper triangular matrix having a size of the third number by the first number;

transforming the received transmission signal to a second sample having the third number of data corresponding to the first sample;

sequentially performing first decoding on a third number of data included in the second sample to decode a second symbol corresponding to the first symbol;

if the second symbol acquired by the first decoding would include second number of the first value data, having the second symbol acquired by the first decoding be the first symbol, or if not, performing second decoding on all of the data held by the second sample to have the second symbol acquired by the second decoding be the first symbol; and decoding transmission objective data from the first symbol acquired by the second decoding.

11. The data decoding method according to claim 10, wherein:

the second decoding includes determining that the second symbol decoded by the first decoding is identical to the first symbol corresponding to the second symbol if the number of value 1 bits included in the second symbol decoded by the first decoding is equal to the second number.

12. The data decoding method according to claim 10, wherein the first decoding includes performing the first decoding by sequentially selecting a combination having a highest possibility of being identical to a fourth number of data included in the second sample.

13. The data decoding method according to claim 12, wherein the fourth number of all possible combinations of data included in the second sample is acquired by transforming the fourth number of data included in the first symbol to the first sample and performing the transformation for the received transmission signal on the transformed first sample.

14. The data decoding method according to claim 13, wherein the first decoding includes sequentially performing the first decoding on the fourth number of data excluding the data which has already been handled as a target of the first decoding, to acquire the second symbol.

15. The data decoding method according to claim 13, wherein the second decoding includes performing the second decoding by selecting a sample having the highest possibility of being identical to the second sample acquired by performing the transformation on the second symbol.

16. The data decoding method according to claim 15, wherein:

the third number of data included in the first symbol and the third number of data included in the second symbol comprise a number of bits; and the sample to be selected is all combinations of the second sample corresponding to all of the second symbol acquired by changing the second symbol such that the difference between the number of value 1 bits included in the second symbol and the number of value 1 bits included in the first symbol is within a predetermined range.

17. The data decoding method according to claim 10, wherein:

the first decoding includes multiplying the inverse matrix of the non-singular matrix by the third number of data of the first sample included in the received transmission signal as a third number by 1 vector to transform to the second sample.

* * * * *

UNITED STATES PATENT AND TRADEMARK OFFICE
CERTIFICATE OF CORRECTION

| | |
|---|---|
| PATENT NO. | : 8,019,005 B2 |
| APPLICATION NO. | : 12/629636 |
| DATED | : September 13, 2011 |
| INVENTOR(S) | : Hamamura |

It is certified that error appears in the above-identified patent and that said Letters Patent is hereby corrected as shown below:

In the Specification:

In Column 2, Line 29, delete "number" and insert -- number) --, therefor.

In Column 3, Line 58, delete "Mc" and insert -- $M_c$ --, therefor at each occurrence throughout the patent.

In Column 3, Line 59, delete "Mt" and insert -- $M_t$ --, therefor at each occurrence throughout the patent.

In Column 3, Line 61, delete "$M_{pc}$," and insert -- $M_{pc}$ --, therefor.

In Column 4, Line 57, delete "$FX_{Bi}=QRX_{Bi}$." and insert -- $Fx_{Bi}=QRx_{Bi}$. --, therefor.

In Column 4, Line 60, delete "$QRX_{Bi}=RX_{Bi}$." and insert -- $QRx_{Bi}=Rx_{Bi}$ --, therefor.

In Column 5, Line 20, after "matrices in" delete "the Claims,".

In Column 5, Line 21, delete "the present" and insert -- of the present --, therefor.

In Column 5, Line 24, before "specification" delete "Claims,".

In Column 5, Line 29, delete "the" and insert -- any claimed --, therefor.

In Column 5, Line 33, after "transposing the" delete "claimed".

In Column 6, Line 32, delete "DESCRIPTION" and insert -- DETAILED DESCRIPTION --, therefor.

In Column 10, Line 6, delete "Mp" and insert -- $M_p$ --, therefor.

Signed and Sealed this
Twenty-fifth Day of June, 2013

Teresa Stanek Rea
*Acting Director of the United States Patent and Trademark Office*

In Column 14, Line 8, delete "Mp," and insert -- $M_p,$ --, therefor.

In Column 14, Line 36, delete "($M_r$)" and insert -- ($M_p$) --, therefor.

In Column 14, in Expression 11, Line 1, delete "$\frac{2\pi(l-1)(m-1)}{M_c+M_0}$" and insert -- $\frac{2\pi(l-1)(m-1)}{M_c+M_0}$ --, therefor.

In Column 16, Line 33, delete "$x_Bi=$" and insert -- $x_{Bi}=$ --, therefor.

In Column 18, Line 12, delete "(xi," and insert -- ($x_i$, --, therefor.

In Column 18, Line 13, delete "0 s" and insert -- 0s --, therefor.

In Column 18, Line 36, delete "0 s" and insert -- 0s --, therefor.

In Column 18, Line 43, delete "$M_t$h" and insert -- Mth --, therefor.

In Column 19, Line 9, delete "X=" and insert -- x= --, therefor.

In the Claims:

In Column 22, Line 63, in Claim 1, delete "symbol," and insert -- symbol --, therefor.

In Column 24, Line 4, in Claim 2, delete "for" and insert -- configured to --, therefor.

In Column 24, Line 4, in Claim 2, delete "performing" and insert -- perform --, therefor.

In Column 24, Line 10, in Claim 2, delete "would include" and insert -- includes --, therefor.

In Column 24, Line 16, in Claim 2, delete "that decodes" and insert -- configured to decode --, therefor.

In Column 25, Line 27-28, in Claim 10, delete "would include" and insert -- includes --, therefor.

UNITED STATES PATENT AND TRADEMARK OFFICE
CERTIFICATE OF CORRECTION

PATENT NO.         : 8,019,005 B2
APPLICATION NO.    : 12/629636
DATED              : September 13, 2011
INVENTOR(S)        : Hamamura It is certified that error appears in the above-identified patent and that said Letters Patent is hereby corrected as shown below:

In the Specification

In Column 5, Line 29, after "configurations" delete "of the claimed vector and matrices".

In Column 5, Line 30, after "configurations" delete "of the vector and matrices".

In Column 6, Lines 7-8, delete "the transmission program" and insert - - a transmitter - -, therefor.

In Column 10, Line 31, delete "212-1 to 212-$M_t$," and insert - - 210-1 to 210-$M_t$ - -, therefor.

In the Claims

In Column 22, Line 59, in Claim 1, delete "apparatus; and" and insert - - apparatus configured to transmit a transmission signal; and - -, therefor.

In Column 22, Line 60, in Claim 1, delete "apparatus," and insert - - apparatus configured to receive the transmission signal from the transmitting apparatus, wherein the received transmission signal includes a different signal component from the transmission signal transmitted by the transmitting apparatus, - -, therefor.

In Column 23, Line 2, in Claim 1, after "into a" delete "transmission".

In Column 23, Line 2, in Claim 1, after "wherein the" delete "transmission".

In Column 23, Line 17, in Claim 1, after "first number;", insert - - and - -, therefor.

In Column 23, Line 18, in Claim 1, delete "a multiplier" and insert - - multiplexing portions - -, therefor.

Signed and Sealed this
Seventeenth Day of September, 2013

Teresa Stanek Rea
*Deputy Director of the United States Patent and Trademark Office*

CERTIFICATE OF CORRECTION (continued)
U.S. Pat. No. 8,019,005 B2

In Column 23, Line 19, in Claim 1, after "included in the" delete "transmission".

In Column 23, Line 19-21, in Claim 1, delete "coefficients; and........apparatus;" and insert - - coefficients to generate the transmission signal; - -, therefor.

In Column 23, Lines 23-26, in Claim 1, delete "a receiver configured........transmitting apparatus;".

In Column 23, Line 27, in Claim 1, delete "configured multiply" and insert - - configured to receive a version of the transmission signal and to multiply - -, therefor.

In Column 23, Line 46, in Claim 2, delete "receiver" and insert - - receiving apparatus - -, therefor.

In Column 24, Line 5, in Claim 2, delete "a" and insert - - the - -, therefor.

In Column 24, Line 9, in Claim 2, delete "decoder," and insert - - decoder configured to have the second symbol acquired by the first decoding be the first symbol - -, therefor.

In Column 24, Lines 10-12, in Claim 2, delete "for having the .........performing" and insert - - wherein the second decoder is configured to perform - -, therefor.

In Column 24, Line 15, in Claim 2, delete "symbol; and" and insert - - symbol if the second symbol acquired by the first decoding does not include the second number of data; and - -, therefor.

In Column 25, Line 24, in Claim 10, delete "a" and insert - - the - -, therefor.